US005621519A

United States Patent [19]
Frost et al.

[11] Patent Number: 5,621,519
[45] Date of Patent: Apr. 15, 1997

[54] IMAGING SYSTEM TRANSFER FUNCTION CONTROL METHOD AND APPARATUS

[75] Inventors: Keith L. Frost, Seattle; Seho Oh, Mukilteo; Jon W. Hayenga, Kent; Kim J. Hansen, Renton, all of Wash.

[73] Assignee: NeoPath, Inc., Redmond, Wash.

[21] Appl. No.: 509,182

[22] Filed: Jul. 31, 1995

[51] Int. Cl.$^6$ .................................................. G01M 11/00
[52] U.S. Cl. ........................................................ 356/124.5
[58] Field of Search ........................................ 356/124.5

[56] References Cited

U.S. PATENT DOCUMENTS

| | | |
|---|---|---|
| 3,743,427 | 7/1973 | Weiser ................................ 356/124.5 |
| 3,824,393 | 7/1974 | Brain . |
| 4,034,342 | 7/1977 | Kruklitis . |
| 4,085,006 | 4/1978 | Mindick et al. . |
| 4,175,860 | 11/1979 | Bacus ........................................ 356/39 |
| 4,812,412 | 3/1989 | Turner . |
| 4,839,194 | 6/1989 | Malluche et al. . |
| 4,870,631 | 9/1989 | Stoddard . |
| 4,965,725 | 10/1990 | Rutenberg . |
| 5,029,226 | 7/1991 | Klein et al. . |
| 5,072,382 | 12/1991 | Kamentsky . |
| 5,125,100 | 6/1992 | Katznelson . |
| 5,139,031 | 8/1992 | Guirguis . |
| 5,193,124 | 3/1993 | Subbarao ................................ 382/255 |
| 5,206,919 | 4/1993 | Keating . |
| 5,257,182 | 10/1993 | Luck et al. . |
| 5,265,112 | 11/1993 | Noll et al. . |
| 5,287,272 | 2/1994 | Rutenberg et al. . |
| 5,315,700 | 5/1994 | Johnston et al. . |
| 5,357,977 | 10/1994 | Michels . |
| 5,361,140 | 11/1994 | Hayenga et al. . |

OTHER PUBLICATIONS

Bacus, James W. and Les J. Grace, "Optical Microscope System For Standardized Cell Measurements and Analyses", *Applied Optics*, 26:16, pp. 3280–3293, 15 Aug. 1987.

Bartels, Peter H., et al., "A Self–Learning Computer Program for Cell Recognition", *ACTA Cytologica: The Journal of Clinical Cytology*, 14:8, pp. 486–494, Oct. 1970.

Tanaka, Noboru, et al., "Automated Cytologic Screening System (CYBEST Model 4): an Integrated Image Cytometry System", Reprinted from *Applied Optics*, vol. 26, No. 16, pp. 3301–3307, Aug. 15, 1987. Copyright© 1987 by the Optical Society of America and reprinted by permission of the copyright owner.

Duda, Richard O. and Peter E. Hart, "Fisher's Linear Discriminant", *Patent Classification and Scene Analysis*, Copyright ©1973, pp. 114–119.

Dytch, Harvey E. et al., "An Interactive Microcomputer–Based System for the Quantitative Analysis of Stratified Tissue Sections", *Analytical and Quantitative Cytology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

Kurman, Robert J. et al., "Part 1: Specimen Adequacy" and Part 2: Descriptive Diagnoses, *The Bethesda System for Reporting Cervical/Vaginal Cytologic Diagnoses*, © 1994 Springer–Verlag, pp. 1–81.

(List continued on next page.)

*Primary Examiner*—F. L. Evans
*Attorney, Agent, or Firm*—Leone & Moffa, P. A.

[57] ABSTRACT

Accurately measuring and controlling the system transfer function of an imaging system, by eliminating interference from aliases. An image is captured of an image primitive with a uniaxial pattern, oriented at an angle to the primary axes of a sampling array. In order to accurately measure the system transfer function, a two-dimensional frequency representation is computed. The aliased components of the representation are separated from the unaliased components by translation in frequency along the axis perpendicular to the axis of the image primitive. Accurate measurement of the system transfer function makes it possible to accurately control the system transfer function.

32 Claims, 20 Drawing Sheets

OTHER PUBLICATIONS

Smith, Warren J., "Modern Optical Engineering: The Design of Optical Systems", Copyright ©1966 by McGraw–Hill Book Company, pp. 308–325.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1561, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 10–15.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 1–9.

Patten, Jr., Stanley, "The Automation of Uterine Cancer Cytology", *Sensitivity and Specificity of Routine Diagnostic Cytology*, Tutorials of Cytology, Chicago, IL, 1976, edited by Wied, Bahr and Bartels, pp. 406–419.

Lundsteen, C., et al., Abstract from *Clin Genet.*, Department of Obstetrics and Gynecology, Rigshospitalet, Copenhagen, Denmark, vol. 45, No. 2, Feb. 1994, pp. 62–66.

Kaplow, L.S., Abstract from *Histochem Cytochem.*, vol. 25, No. 8, Aug. 1977, pp. 990–1000.

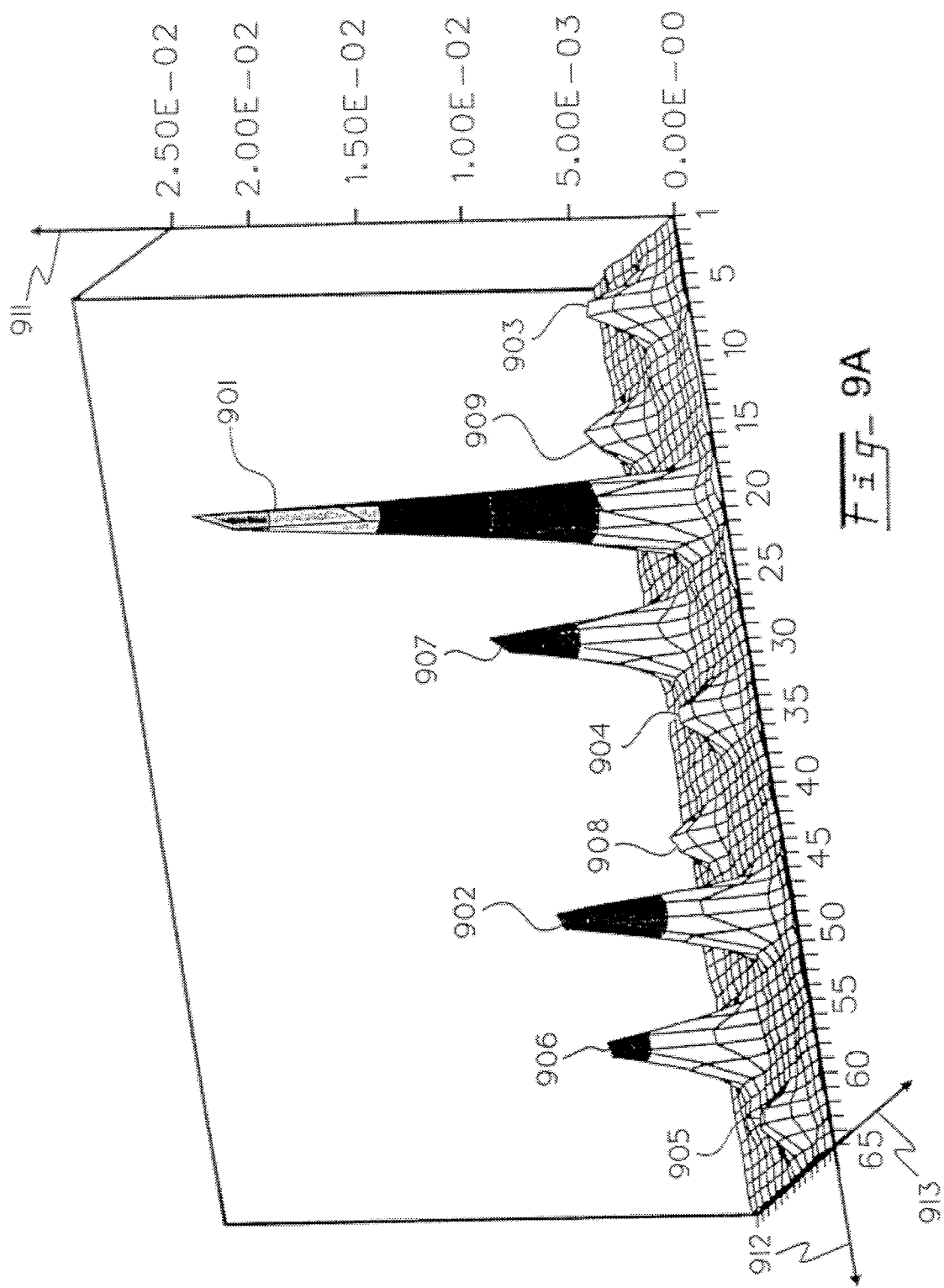

IMAGING SYSTEM TRANSFER FUNCTION CONTROL METHOD AND APPARATUS

The invention relates to the measurement and control of the system transfer function of an imaging system, and more particularly to the measurement and control of the transfer function of an imaging system having an image sampler, such as a charge coupled device, and image processing hardware configured to interpret sampled images.

BACKGROUND OF THE INVENTION

The well known modulation transfer function (MTF), and phase transfer function (PTF) provide measures of imaging resolution and performance for an imaging system. The MTF and PTF uniquely define the resolution and performance of a particular imaging system to the extent that the imaging system is linear and shift-invariant. The MTF and PTF can be mathematically combined into a single complex-valued quantity called the system transfer function (STF), given by the equation:

$$S = M \exp(i\phi) \quad (1)$$

where S is the STF, M is the MTF, and $\Phi$ is the PTF. The STF, often referred to as the optical transfer function (OTF), may be used interchangeably with OTF.

Assuming linearity and shift-invariance, the STF allows the computation of the image output of the system for any image input, according to the equation:

$$O = F^{-1}[S \times F[I]] \quad (2)$$

where I is the image input to the system, O is the image output, F is the Fourier Transform operator, and $F^{-1}$ is the inverse Fourier Transform operator. Equation (2) implies that if S=1, the input image passes through the imaging system to the output unaltered.

In an optical system, aberrations, improper focus, lens imperfections such as pits or scratches, and foreign material in the optical train, such as dust, can all affect the STF, and hence the image quality. In an imaging system which contains electronic circuitry, the bandwidth and other performance characteristics of the relevant electronic components can also affect the STF.

In an imaging system where images are captured to be electronically processed and classified by a computer, alternately known as an image interpretation system, maintaining a consistent STF becomes much more important. Unless specifically and carefully designed to do so, the image interpretation systems of the prior art will not detect or correct for differences in STF, which can be caused by manufacturing tolerances, environmental variations, or components which have become improperly adjusted or defective.

Therefore, it is one motive of the invention to accurately measure and monitor the STF of imaging systems which are part of an image interpretation system. Without monitoring, the performance of the image interpretation system can vary significantly due to differences in STF. Without accurate measurement, close monitoring of the STF is difficult.

The prior art has found it difficult to achieve accurate measurement of the STF, for several reasons. One significant difficulty is presented by the fact that image interpretation systems are designed to store and process images in a sampled, digital form. Once an image is sampled and becomes discrete, as happens when the image is sensed by a charge coupled device (CCD), or converted to digital form by an analog-to-digital (A/D) converter, Equation (2) no longer completely describes the affect of the system on the image. In particular, the system is no longer shift invariant.

A sampling imaging system is characterized by a sampling function G, defined by $$G(\vec{x}) = \sum_{i=1}^{N} \delta(\vec{x} - \vec{y}_i) \quad (3)$$

where $\vec{Y}_i$ denotes the N points at which the image is sampled, $\vec{x}$ denotes the image domain, and $\delta$ is the Dirac delta function, which is zero except when its argument vanishes, and which integrates to one over its domain. Using the sampling function G, the system response equation of a sampling image system may be written:

$$O_s = G \times F^{-1}[S_2 \times F[G \times F^{-1}[S_1 \times F[I]]]] \quad (4)$$

where $O_s$ represents the sampled image output, $S_1$ is a system response function for that part of the system which affects the formation of the image prior to sampling, and $S_2$ is a second system response function for that part of the system affecting the image after initial sampling. $S_2$ is relevant to systems in which the image signal is transferred in analog form, even after initial sampling. This is how typical CCD cameras work, for instance.

It may seem at first that there is, in a sampled image system as described by Equation (4), no single function which can be called the STF. The effect of multiplication by the sampling function G in the spatial domain is equivalent to convolution with the Fourier transform of G in the frequency domain.

$$G \times I = F^{-1}[\tilde{G} * \tilde{I}], \text{ where} \quad (5)$$

$$\tilde{G} = F[G] \quad (6)$$

$$\tilde{I} = F[I] \quad (7)$$

But if the sampling array defined by $\vec{y}_i$ is periodic, or nearly so over a substantial region, the Fourier transform of G will comprise an array of sharp signal peaks at integer multiples of the sampling frequency. Convolution with this array adds shifted copies of the signal to itself in the the frequency domain, where each copy is shifted by appropriate integer multiple of the sampling frequency.

Thus, if an unsampled image is restricted to contain only frequencies below half the sampling frequency, the corresponding sampled image will be, in the Fourier domain, a copy of the unsampled image, at frequencies below half the sampling frequency. This is the well-known Nyquist theorem, and half the sampling frequency is often called the Nyquist frequency for this reason. From Equation (4), it follows that for input frequencies below the Nyquist frequency, an STF is defined by the equation:

$$S = S_2 \times S_1 \quad (8)$$

Refer now to FIG. 1 which shows a lens 102, representing part of an imaging system. An image primitive 101, here represented by a narrow slit is imaged by the lens 102 onto the image plane 103. The image plane 103 is defined by a sampling device, here an array of charge-coupled-device (CCD) pixels 104. After sampling, the image is read out of the device and processed to determine its frequency content. FIG. 2 shows part of a representative line from a sampled image of a test pattern like FIG. 1. In this case, the image primitive was a bar pattern, which cycled from white to black and back with a period of about thirty pixels.

One difficulty with this prior art method of measuring the frequency response occurs in the sampling. As described above, if the image primitive contains frequencies above the Nyquist frequency of the sampling array, and those frequencies are passed by the imaging system, they will be added by sampling to the frequency response at lower frequencies, causing the measurement of the frequency response to be inaccurate.

FIG. 3 illustrates this problem, known as aliasing. FIG. 3 is a plot of the amplitude of the Fourier transform of the windowed sampled bar pattern signal, part of which was plotted in FIG. 2. The spectrum comprises a series of signal peaks, reflecting the periodic nature of the signal. The peaks 301, 302, 303, 304, 305, 306, 307 and 308 are the odd harmonics from one to fifteen, respectively. The even harmonics do not appear in this signal because of the symmetry between the light and dark halves of the bar pattern. The peaks beyond the fifteenth harmonic are effectively reflected back from the Nyquist frequency, or aliased. In particular, the peaks 309, 310, 311, 312 and 313 are the image of the odd harmonics from 17 to 25, respectively.

Note that in this signal, the aliased peaks 309, 310, 311, 312 and 313 are distinct in frequency from the unaliased peaks 301, 302, 303, 304, 305, 306, 307 and 308, making accurate measurement of the frequency response possible, both below and above the Nyquist frequency. If the magnification of the imaging system or the period of the bar pattern had been slightly different, however, the aliased peak 309 would directly interfere with the measurement of the peak 307, and so on, rendering inaccurate the measurement of the frequency response below the Nyquist frequency, and destroying any measurement of the frequency response above the Nyquist frequency.

One solution to this problem is to prepare image primitives with strictly band-limited frequency content. For example, sinusoidal image primitives, which provide a signal containing only a single non-zero frequency component, may be employed. Unfortunately, such image primitives are difficult and expensive to produce accurately. Another solution is to use a very fine sampling array, so that the Nyquist frequency lies beyond the cutoff frequency of the imaging system, in order that once again, no signal will pass beyond the Nyquist frequency. However, this solution will often require very high resolution cameras, which are expensive, and slow to read out.

SUMMARY OF THE INVENTION

The invention provides a method to measure a system transfer function of an imaging system having an input and an image sampler with a discrete image output wherein the discrete image output can be represented by a frequency representation with aliased components and unaliased components. According to the method of the invention, an image primitive is provided to the input, where the image primitive has a substantially uniaxial pattern having a predetermined frequency representation. The image primitive is oriented at a predetermined angle relative to the image sampler wherein the predetermined angle is chosen to separate the aliased components from the unaliased components. A discrete image of the image primitive is obtained with the imaging system. A two-dimensional frequency representation of the discrete image is computed. A region of the two-dimensional frequency representation is selected and compared to the predetermined frequency representation to compute the system transfer function.

The invention also provides an apparatus to measure frequency response of an imaging system having an input and an image sampler with a discrete image output wherein the discrete image output can be represented by a frequency representation with aliased components and unaliased components. An image primitive is placed in view of the input, the image primitive comprising a substantially uniaxial pattern having a predetermined frequency representation, where the image primitive is oriented at a predetermined angle relative to the image sampler wherein the predetermined angle is chosen to separate the aliased components from the unaliased components. A means for computing a two-dimensional frequency representation of the discrete image output is connected to the discrete image output, the computing means having a computing output. A means for selecting a region of the two-dimensional frequency representation is connected to the computing output, the selecting means having a selected region output. A means for comparing the region to the predetermined frequency representation to compute the optical transfer function is connected to the selected region output and has an optical transfer function output. The means for computing a two dimensional frequency representation of the discrete image output may further comprise a digital computer.

The invention further provides an imaging system control apparatus, for an imaging system having a transfer function control input, wherein the imaging system has a system transfer function and system transfer function control input. Means for measuring the system transfer function of the imaging system having a system transfer measure output, and means for controlling the system transfer function in response to the system transfer measure are connected to the system transfer measure output. The means for controlling the system transfer function is connected to the system transfer function control input. The imaging system further may comprise a charge coupled device camera.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 9A shows a graph of the amplitude of part of the Fourier transform of a sampled bar pattern image.

DETAILED DESCRIPTION OF THE PREFERRED EMBODIMENT

The invention more accurately measures the system transfer function of an image interpretation system having an image sampler, by eliminating alias interference in the sampled image below the Nyquist frequency. The invention also makes possible the accurate measurement of the frequency response of the imaging system beyond the Nyquist frequency. The invention accomplishes these goals by presenting to the imaging system a uniaxial image primitive oriented at a predetermined angle to the sampling array of the imaging system. The uniaxial image primitive has a predetermined one-dimension frequency representation. The system transfer function is measured by computing a two dimensional frequency representation of the sample image output of the system, selecting a region of the two-dimensional frequency representation, and comparing the data in the region to the predetermined one-dimensional frequency representation of the image primitive.

Figure 1:
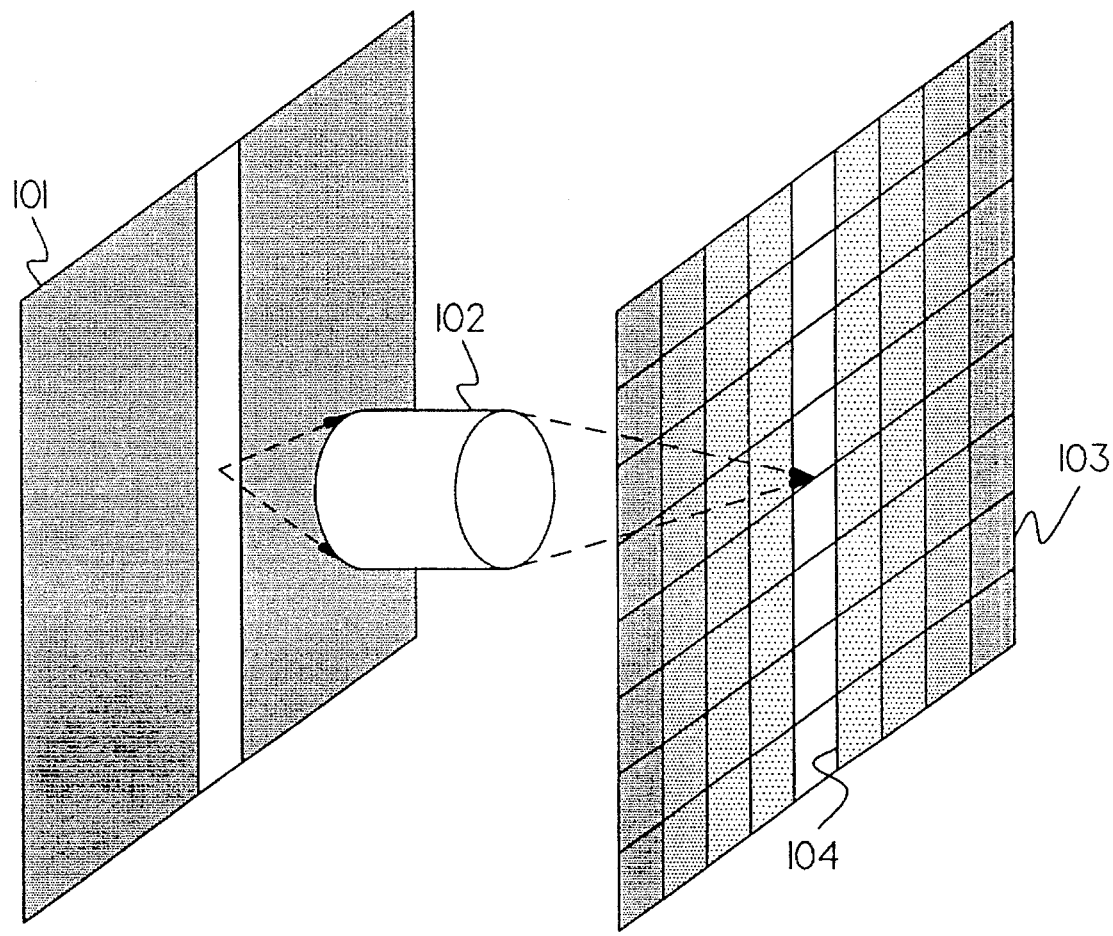
FIG. 1 shows a lens imaging an image primitive onto an image plane.
Figure 2:
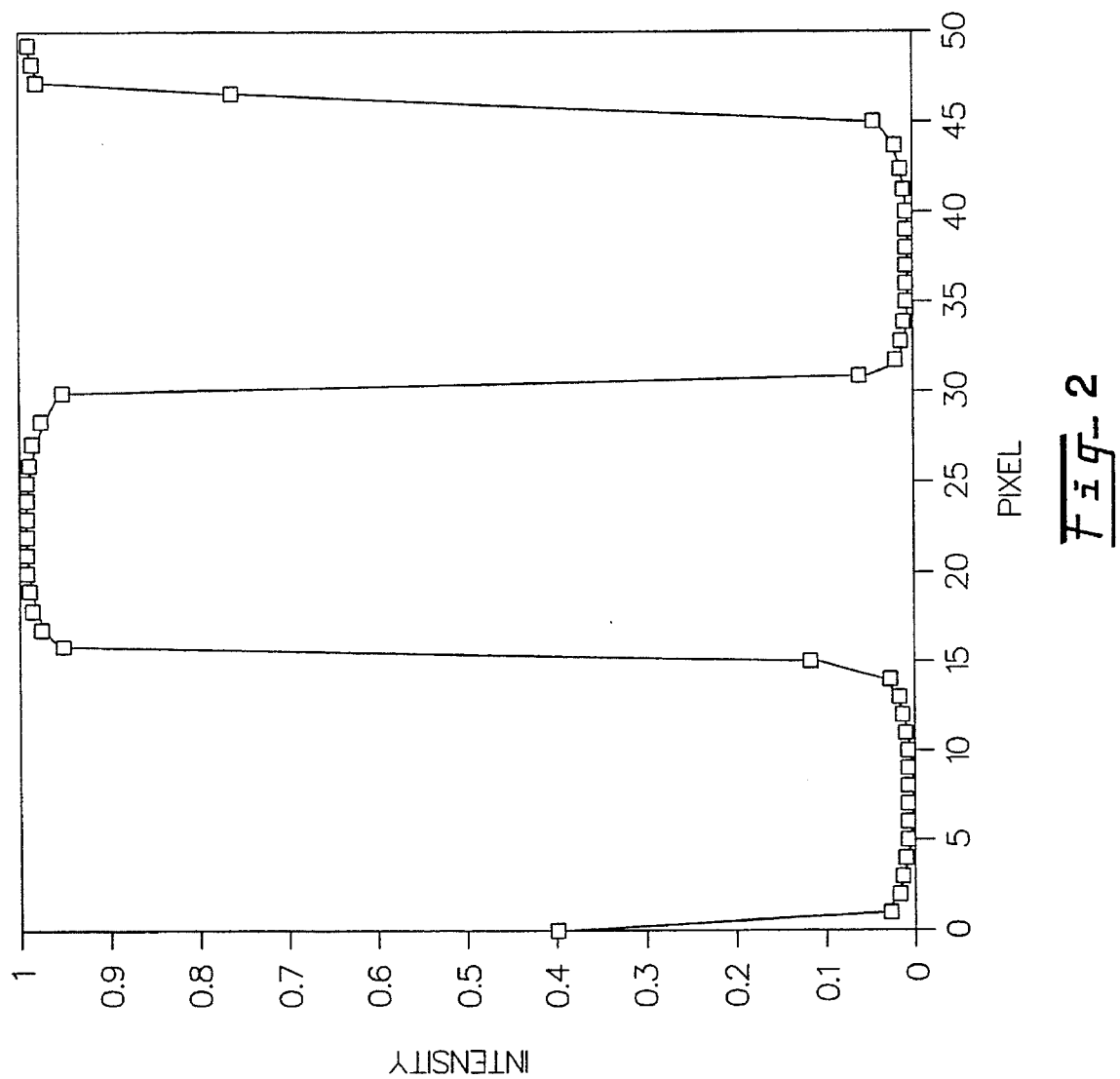
FIG. 2 shows part of a representative line from a sampled image of a bar pattern image primitive.

A uniaxial image primitive is a two-dimensional image primitive prepared so that it possesses an axis along which there is almost no variation in the image intensity. An example 101 of such an image primitive is shown in FIG. 1, as the image primitive 101 had no variation in intensity along the vertical axis. Any image P is uniaxial if it satisfies the equation:

$$P(\vec{x}) = f(\vec{x} \cdot \hat{n}) \quad (9)$$

where $\vec{x}$ denotes any vector in the image domain, $\hat{n}$ is a vector which defines the modulation axis of the image, "." denotes an inner product, and f is a function of one variable which describes the modulation.

The predetermined angle between the sampling array and the uniaxial image primitive is chosen to separate the aliased and unaliased components of the image in the two-dimensional frequency domain. The selected region of the frequency representation will usually be chosen to contain only the unaliased components. This allows measurement of the system transfer function below the Nyquist frequency to take place without interference by the aliased components of the signal. Alternatively, a region may be selected which contains only the aliased components, allowing one to assess the frequency response of the system to frequencies beyond the Nyquist frequency.

The invention provides a method and apparatus for more accurately measuring the frequency response of an imaging system using a simple and relatively inexpensive image primitive, and a relatively low resolution sampling device, while at the same time avoiding interference from aliasing. The invention provides an image primitive with a substantially uniaxial pattern, oriented at a predetermined angle to the primary axes of the imaging system's sampling array. In order to accurately extract the frequency response of the system using this arrangement, a two-dimensional Fourier transform is employed. The use of the two-dimensional transform separates the aliased components of the signal from the unaliased components of the signal by translation in frequency along the axis perpendicular to the primary signal axis.

Figure 4:
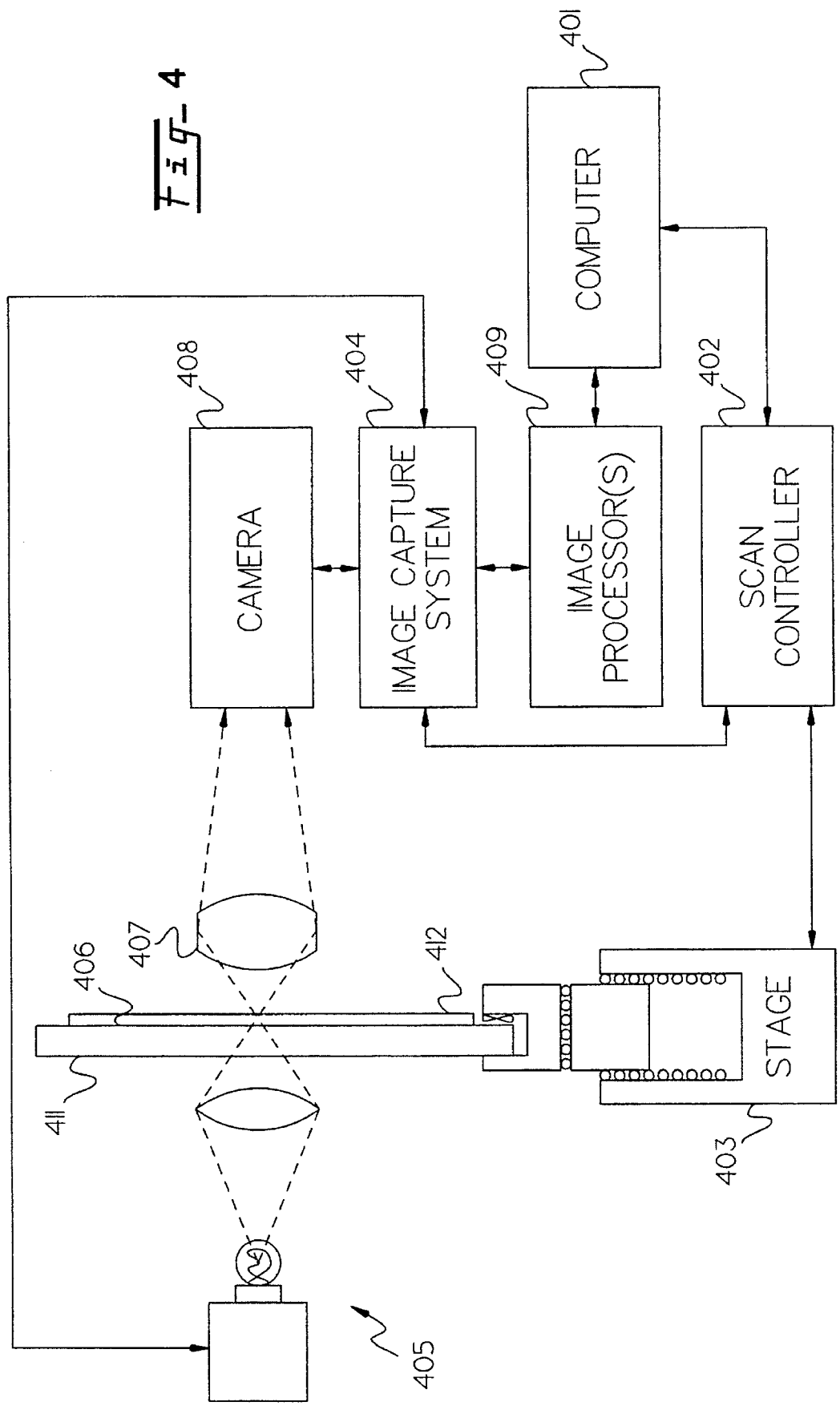
FIG. 4 shows a block diagram of an apparatus of the invention.

Refer now to FIG. 4 which shows a block diagram of the apparatus of the invention. A digital computer 401 controls the processing of a scan controller 402 and one or more image processing devices 409. The scan controller 402 directs the action of a motorized stage 403 which is used to control the position and orientation of an image primitive 406. The scan controller 402 also interfaces to an image capture system 404, directing it to capture images in coordination with the motion of the stage 403. The image capture system signals the illumination system 405 to flash when an image is to be captured. The illumination system 405 focuses a stroboscopic flash of light onto the image primitive 406, an image of which is formed by an objective lens 407 at the light-sensitive surface of an electronic camera 408. The image primitive 406 is prepared on the surface of a transparent slide 411, and covered by a cover glass 412.

The electronic camera 408 senses the image, and, as controlled by the image capture system 404, passes it to the image capture system 404 in an electronic form. The image capture system 404 converts the image into a digital, sampled form suitable for processing by one or more image processing devices 409. The image processing devices 409 are configured by the digital computer 401 to perform the required manipulations on captured images, and the results of these manipulations are then communicated to the computer 401 to be further processed and interpreted. The combined system transfer function (STF) of the objective lens 407, the camera 408, and the image capture system 404 is measured in this system.

Figure 5:
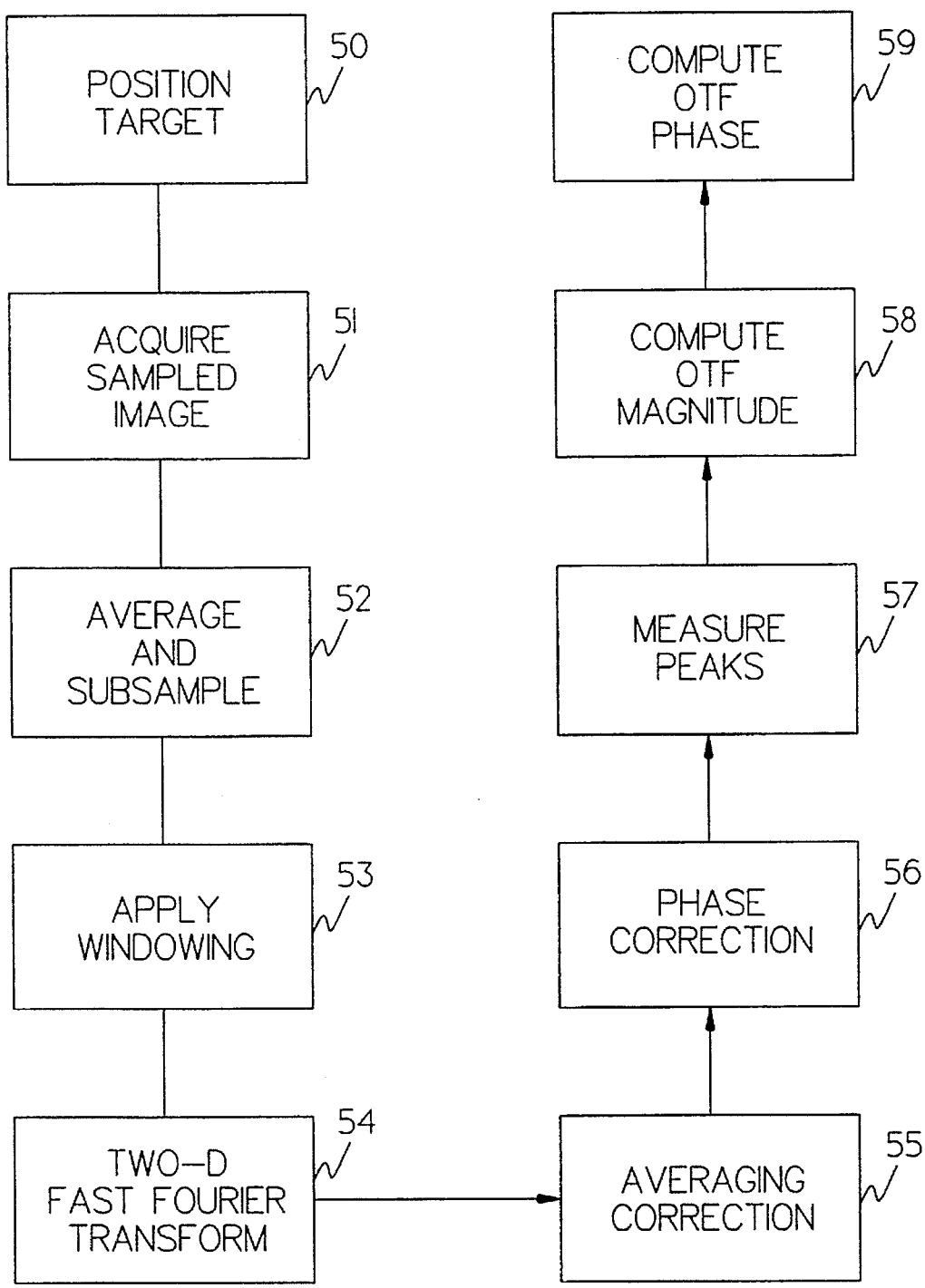
FIG. 5 shows a flow diagram, indicating the processing steps needed to implement the invention.

Refer now to FIG. 5 which shows the process flow diagram of the steps used to extract the system transfer function in one embodiment of the invention. In step 50, the scan controller 402, as controlled by the computer 401, causes the stage 403 to move the image primitive 406 into a predetermined position and orientation such that the image primitive 406 is in view of the objective lens 407, and such that the primary axes of the image primitive are at a predetermined angle, for example 2°, to the axes of the sampling array of the electronic camera 408.

In step 51, once the image primitive 406 is correctly positioned, the scan controller 402 directs the image capture system 404 to capture an image of the image primitive 406. The image capture system 404 signals the illumination system 405 to flash. The illumination system 405 focuses a flash of light onto the image primitive 406. The objective lens 407 forms an image of the image primitive 406 on the sampling array of the camera 408. The camera 408, after sensing and sampling the image, passes it to the image capture system 404 in an electronic form. The image capture system 404 converts the image into a digital, sampled form, and passes it to the image processing devices 409.

Figure 7A:
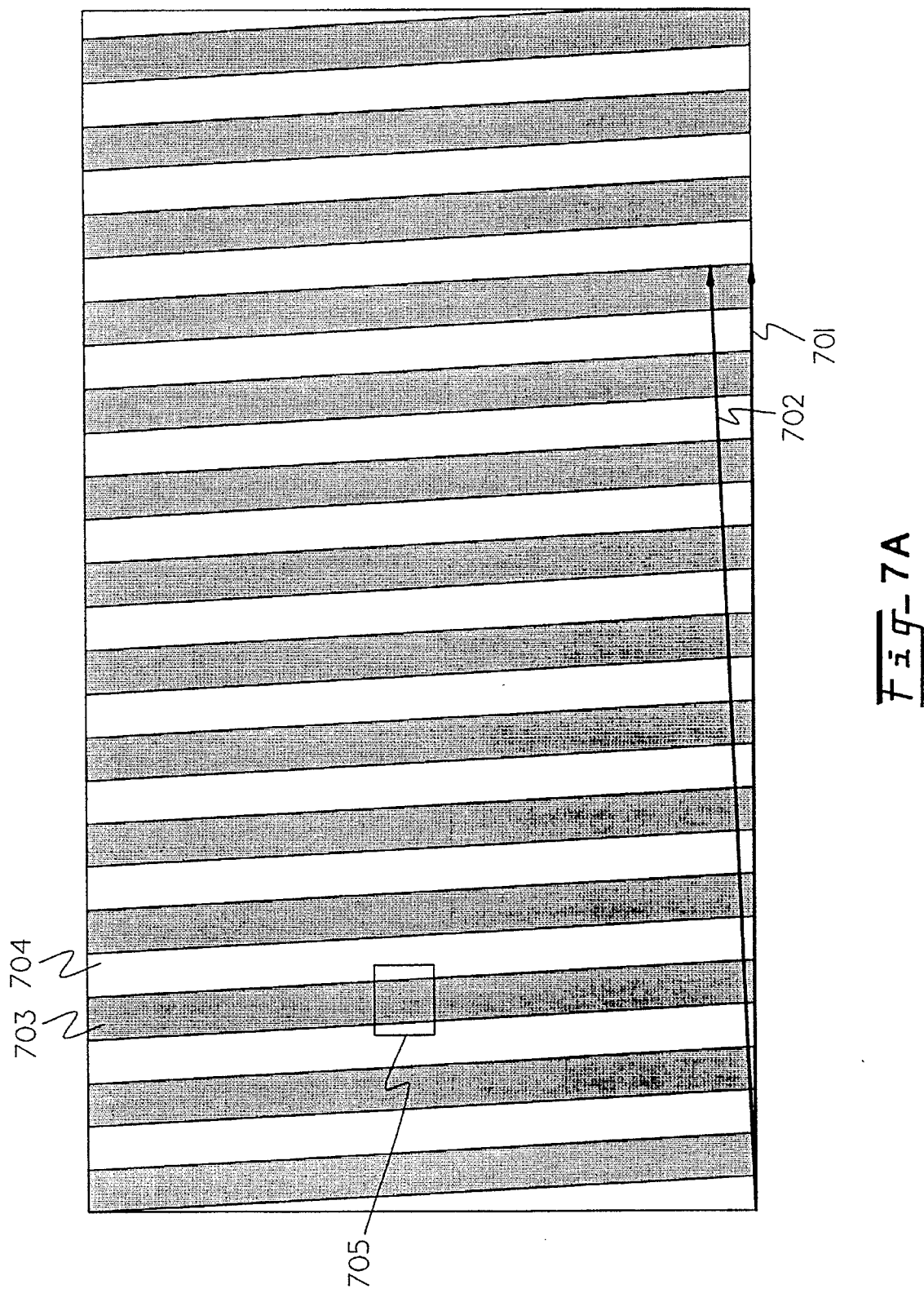
FIG. 7A shows a sketch of a periodic bar pattern image primitive.
Figure 7B:
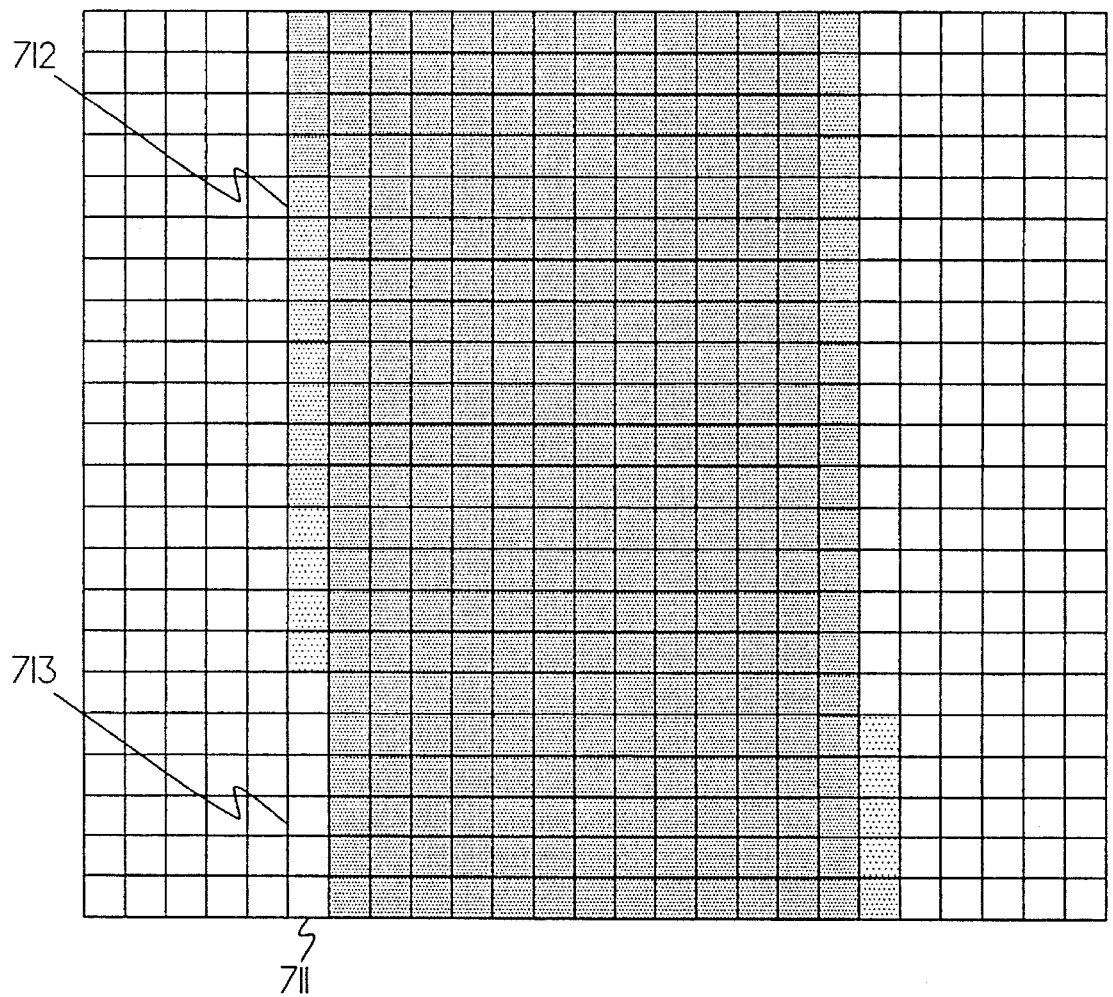
FIG. 7B shows a detailed sampled representation of a part of the periodic bar pattern in FIG. 7A.

Refer now to FIG. 7A which shows one example of a captured image of a uniaxial image primitive. The image primitive comprises a series of opaque bars 703 alternating with transparent bars 704, having a primary axis of modulation 702. One axis of the sampling array 701 is shown. FIG. 7B is an expanded view of a region of the image inside the frame 705.

Refer now to FIG. 7B which shows the pixels that comprise the sampling array, pixels 712 and 713. The column of pixels labelled 711 are oriented very nearly along one edge of the opaque bar 703. But since there is a small angle between the modulation axis 702 of the image primitive and the axis 701 of the sampling array the edge of the opaque bar 703 gradually crosses the column of pixels 711. At pixel 712 the opaque bar very nearly blocks all light from the pixel, while at pixel 713, it blocks almost none of the light. Between these two pixels, along the column 711, the two-dimensional sampled image has 14 samples evenly spaced along the edge of the bar, as opposed to the one or two samples which would be acquired by sweeping across a single row of pixels. It is these extra samples which are used in the technique of the invention to distinguish aliased from unaliased information.

Figure 7C:
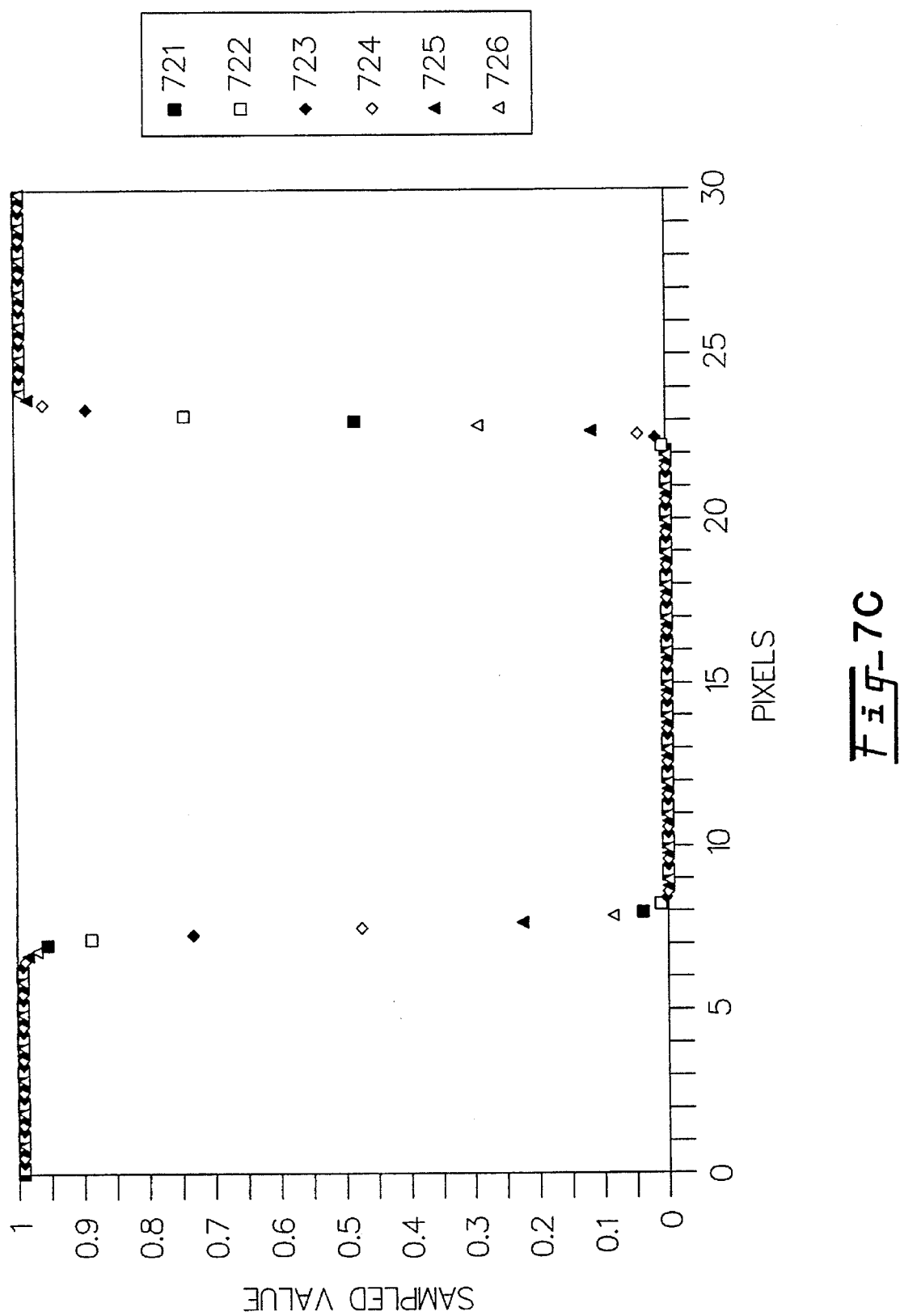
FIG. 7C shows a graph of several rows of pixels taken from the sampled representation illustrated in FIG. 7B.

FIG. 7C is a plot of the sampled gray levels from some of the pixels in FIG. 7B. The abscissa of the plot indicates the distance in pixels along the modulation axis 702 of the bar pattern. The ordinate indicates the gray level of the pixels. The series of points 721 plots all of the pixels from the same row as the pixel 713. Each of the series 722, 723, 724, 725, and 726 plots the pixels from every third row, from the row of pixel 713 to the row of pixel 712, in sequence. Note the way the gray levels of the different series are spread out between 7 and 8 pixels along the abscissa, and again around 23 pixels. If only data from a single row were considered, there would be only one pixel in each of these bands.

This illustrates that because the modulation axis 702 is at a non-zero angle relative to the sampling axis 701, the information from multiple sampling rows can be integrated to achieve an effective sampling resolution along the modulation axis 702 which is much higher than the physical sampling resolution. The invention achieves a higher effective sampling resolution allowing the more precise measurement of transfer function.

Refer once again to FIG. 5. In step 52, the image acquired in step 51 may be averaged and subsampled in the sampling axis perpendicular to the axis 701 by the image processing devices 409. If the angle between the axis 701 and the modulation axis 702 is sufficiently small the invention need not measure the higher spatial frequencies in the sampling axis perpendicular to axis 701. This criterion is described in more detail with reference to step 54 the two-dimensional Fast Fourier Transformation (FFT) of the data. The purpose of subsampling is to reduce the memory and computational time required to process the image. Averaging reduces the noise associated with subsampling. In one embodiment of the invention, only one subsample is collected for every 16 pixels in the original image. The subsample taken is the average of the 16 pixel values. The subsampled image is used in all subsequent processing steps.

It is known in the art to multiply data by a windowing function prior to Fourier transformation, in order to reduce the artifact, brought about by using a finite data sample, of leakage of signal energy into frequencies unrelated to the signal. This is performed by the image processing devices 409 at step 53. A useful example of such a windowing function for the images collected in one example embodiment is:

$$W(x,y)=\sin^4(\pi x/L_x)\sin^4(\pi y/L_y) \quad (10)$$

where W is the windowing function, and x and y are the Cartesian coordinates of the image, as measured in samples, which vary from 0 to $L_x-1$, and from 0 to $L_y-1$, respectively. The windowed image is used in all subsequent processing steps.

In step 54, the image processing devices 409 compute the two-dimensional FFT of the windowed, subsampled image computed in step 53. Since the image is real-valued, only half of the frequency domain needs to be calculated, since the Fourier transform of a real signal has the property that:

$$\tilde{f}(-\vec{k})=\tilde{f}^*(\vec{k}) \quad (11)$$

where $\tilde{f}$ is the Fourier transform of a real signal, $\tilde{f}^*$ is the complex conjugate of $\tilde{f}$, and $\vec{k}$ is an arbitrary frequency.

Figure 6:
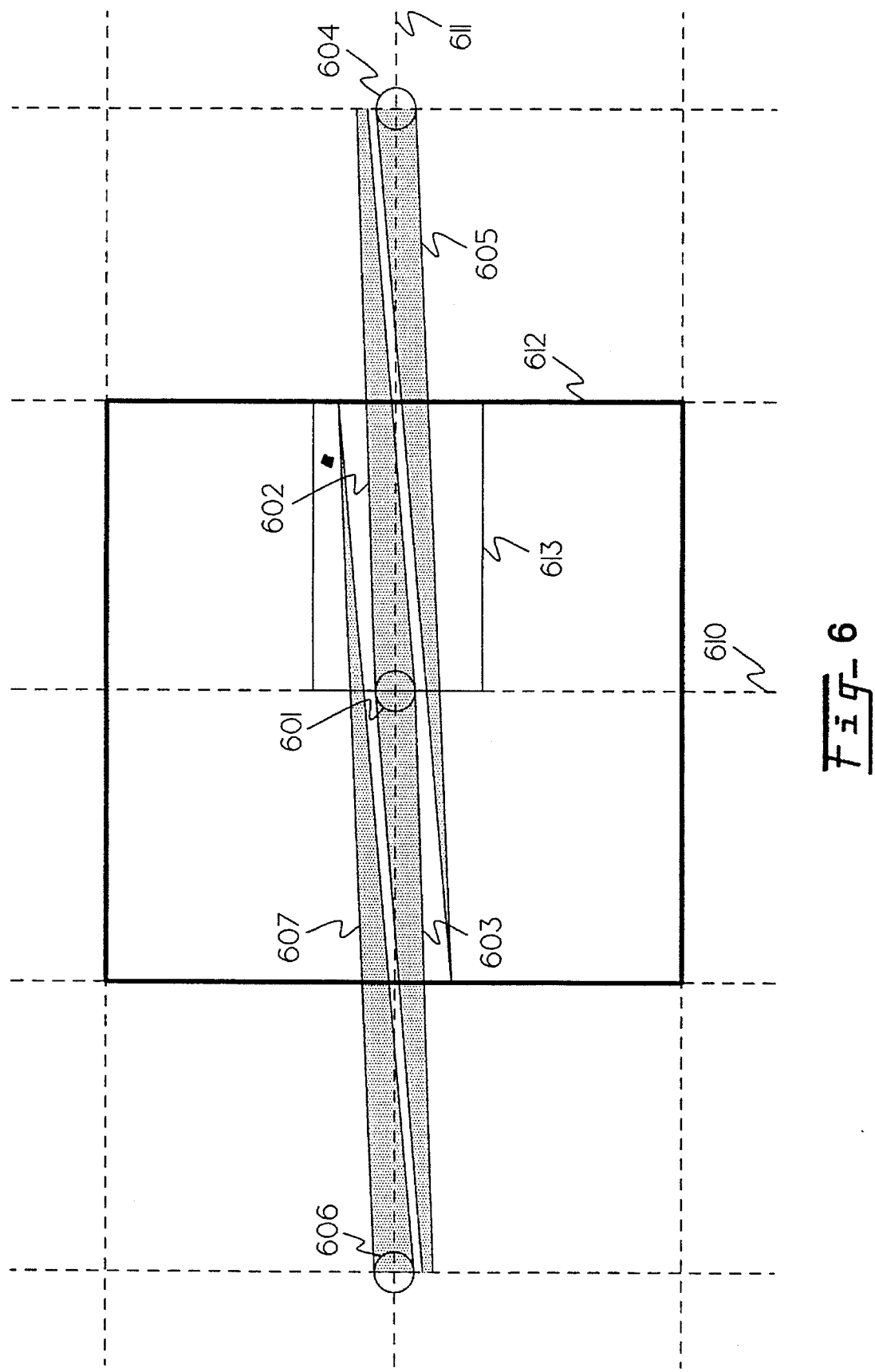
FIG. 6 shows a schematic illustration of the position of sampled signal information in the Fourier domain, shown to clarify the principle of the invention.

Refer now to FIG. 6 which shows a schematic of the two-dimensional Fourier domain of the signal. FIG. 6 illustrates the method of the invention to separate signal information from below the Nyquist frequency and information from above the Nyquist frequency. FIG. 6 represents a two-dimensional frequency representation, such as a Fourier transform, of an arbitrary uniaxial pattern. The dashed line 610 is the line of zero horizontal frequency, while the dashed line 611 is the line of zero vertical frequency. Further dashed lines parallel to these two are drawn at integer multiples of the Nyquist frequency. A circle 601 is drawn around the point of zero frequency. The shaded region 602 represents the unsampled signal in the positive frequency domain, and the region 603 represents the unsampled signal in the negative frequency domain. For a real-valued signal, as pointed out in Equation (11), the signal in region 603 is the complex conjugate of the signal in region 602, after inversion through the origin. The width of the shaded regions represents the intensity of the signal. For the purpose of illustration, the intensity of the signal is assumed to drop to zero at three times the Nyquist frequency.

As noted above, sampling in the spatial domain corresponds to convolution with an array of sharp peaks in the frequency domain. The interval between the peaks is equal to the sampling frequency. The circles 601, 604, and 606 are drawn around the locations of the peaks in FIG. 6. Convolution with these peaks causes the original signal information to be copied and shifted, or aliased. The sampled signal in region 605 is a shifted copy, or alias, of the original signal in region 603. Similarly, the sampled signal in region 607 is an alias of the original signal in region 602. If the signal is confined to the regions shown in the diagram, the aliases 605, 607 do not overlap the original signal region 602, and region 603.

Note that any substantially uniaxial pattern, if oriented at an appropriate angle to the sampling grid, will be confined to regions like those shown in FIG. 6. In particular, the angle between region 602 and the axis 611, which causes the aliases not to overlap the original signal, is equal to the angle between the axis 702 of the uniaxial pattern and the axis 701 of the pixel array in the sampled image. Any choice of angle which prevents overlap of the aliased signal with the unaliased signal in this diagram may be a useful choice. In one embodiment of the invention, it is considered desirable to make the angle as small as possible, while still avoiding overlap, in order to measure the frequency response almost parallel to the sampling axis 701.

Those skilled in the art will recognize that all of the original signal, at whatever frequency, will appear aliased somewhere inside the Nyquist boundary 612. Also note that for the example signal considered here, because the angle between the axis 611 and the region 602 is small, all of the relevant information lies inside boundary 613. It is this fact which allows the invention to subsample the axis 610 nearly perpendicular to the modulation axis, as no relevant information is lost by throwing away the higher frequencies in this secondary axis.

Refer back to FIG. 5, where in step 55 the image processing devices 409 correct in the frequency domain the effects of any averaging performed at step 52 in the spatial domain. Averaging prior to subsampling is performed by convolving with a box function, so the frequency response must here be divided by the Fourier transform of the box function in the secondary axis 610. The correction nulls the effect of the averaging on frequencies below the subsampled Nyquist frequency, but the averaging still suppresses noise from above the subsampled Nyquist frequency which would otherwise be aliased into the subsampled signal.

For the purposes of defining the Fourier transform of an image, an origin of the coordinates is chosen. A conventional choice of origin is at one of the corners of the image.

However, with this choice, an oscillation of the phase of the FFT from 0 to $\pi$ between adjacent computed values is introduced. This oscillation is removed in step 56 by multiplying the FFT by $-1$ at every other computed value. This step is again performed by the image processing devices 409. The multiplication effectively shifts the origin of coordinates to the center of the image in the spatial domain.

Figure 3:
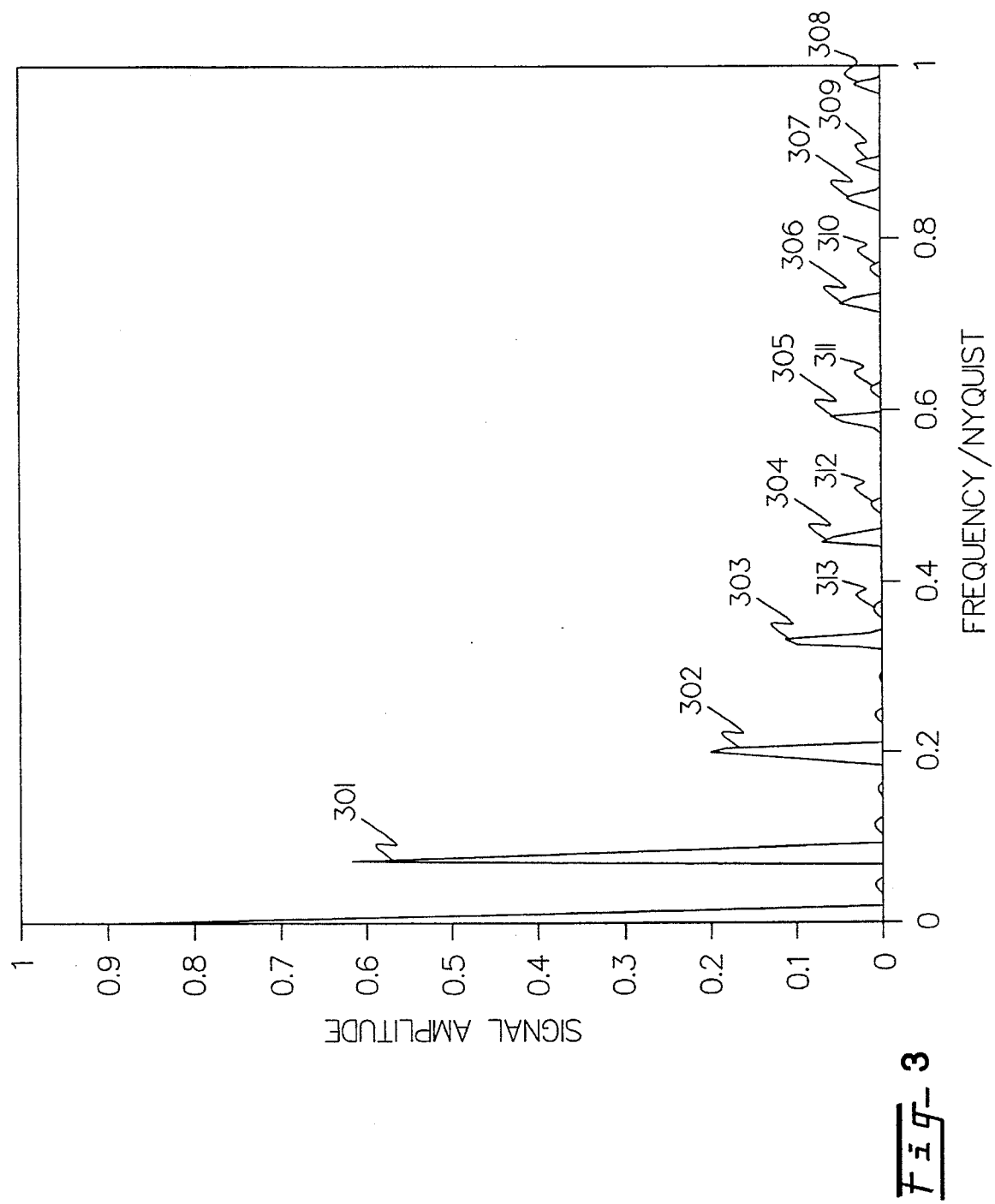
FIG. 3 shows a plot of the amplitude of a one-dimensional Fourier transform of a sampled bar pattern signal.
Figure 8:
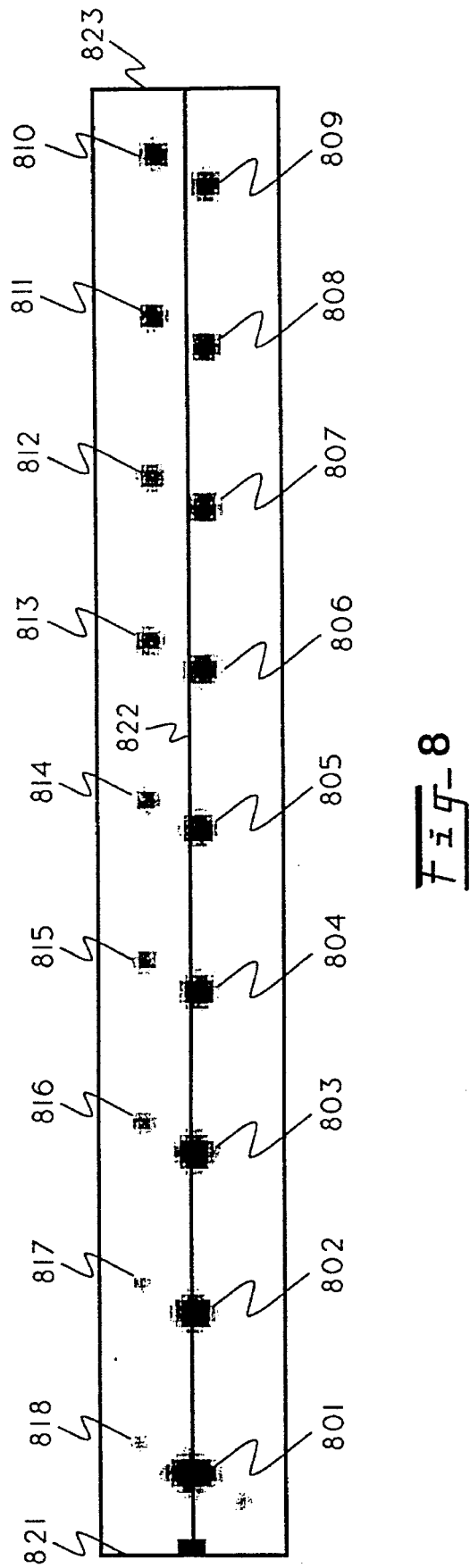
FIG. 8 shows a density plot of the amplitude of a Fourier transform of a sampled bar pattern image.

After step 56, the two-dimensional FFT of the signal within a region similar to the one within the boundary 613 has been correctly computed. FIG. 8 shows a density plot of one example of the result of such a computation, performed on a bar pattern image much like the one illustrated in FIG. 7A. The horizontal axis 822 of the image represents horizontal frequencies, from zero frequency at the extreme left 821 to the positive Nyquist frequency at the far right 823. The vertical axis 821 represents vertical frequencies, and the line of zero vertical frequency 822 splits the image in half, with positive frequencies in the top half, and negative frequencies in the bottom half. The dark spots on the image are signal peaks: the darker the image, the greater the amplitude of the signal. The shape of the signal peaks is determined by the windowing function applied prior to Fourier transformation. Just as was seen in the one-dimensional Fourier transform of the bar pattern in FIG. 3, only odd harmonics are present. Since the bar pattern is skewed relative to the pixel grid, the odd harmonic signal peaks 801, 802, 803, 804, 805, 806, 807, 808 and 809 below the Nyquist frequency occur along a line which is rotated through a small angle relative to the line of zero vertical frequency 822. However, the aliasing array which produces the alias peaks 810, 811, 812, 813, 814, 815, 816, 817 and 818 is set by the sampling array of pixels, and therefore does not change when the bars are rotated. The result, as clearly shown in FIG. 8, is that the alias peaks 810, 811, 812, 813, 814, 815, 816, 817 and 818 are offset in frequency from the unaliased signal peaks 801, 802, 803,804, 805, 806, 807, 808 and 809 along the axis 821. Thus both unaliased and aliased information can be measured accurately, without interference, regardless of small changes in magnification.

Refer back to FIG. 5, where at step 57 in one embodiment of the invention either the image processing devices 409 or the computer 401 measures the peaks in the two-dimensional Fourier transform of the image. Using a periodic image primitive in the context of the invention has the advantage that the signal information is concentrated into amplitude peaks in the Fourier domain. This concentration of signal information enhances the signal-to-noise ratio of the measurement of system transfer function at the peak frequencies. FIG. 8 illustrated the concentration of signal into peaks for the specific example of a bar pattern.

Measuring the peaks means that the frequencies, amplitudes, and phases of the peaks are to be measured. The first step in measuring the signal peaks is to automatically identify or find them. Several techniques may be applied to finding the signal peaks. First, since the image primitive is uniaxial, the unaliased peaks will all lie along a line passing through the origin in the frequency domain, at an angle equal to the angle between the axis of the sampling array and the axis of modulation of the image primitive. This line may be found either by referring to the predetermined angle, or by adding up the signal power along several candidate lines, and selecting the candidate line with the most signal power. Secondly, the largest signal peak may be found by identifying a small region along the line with the highest amplitudes. Once the largest signal peak is found, all other signal peaks may be found relative to the largest signal peak. Once the peaks are found, they must be accurately measured.

Figure 9B:
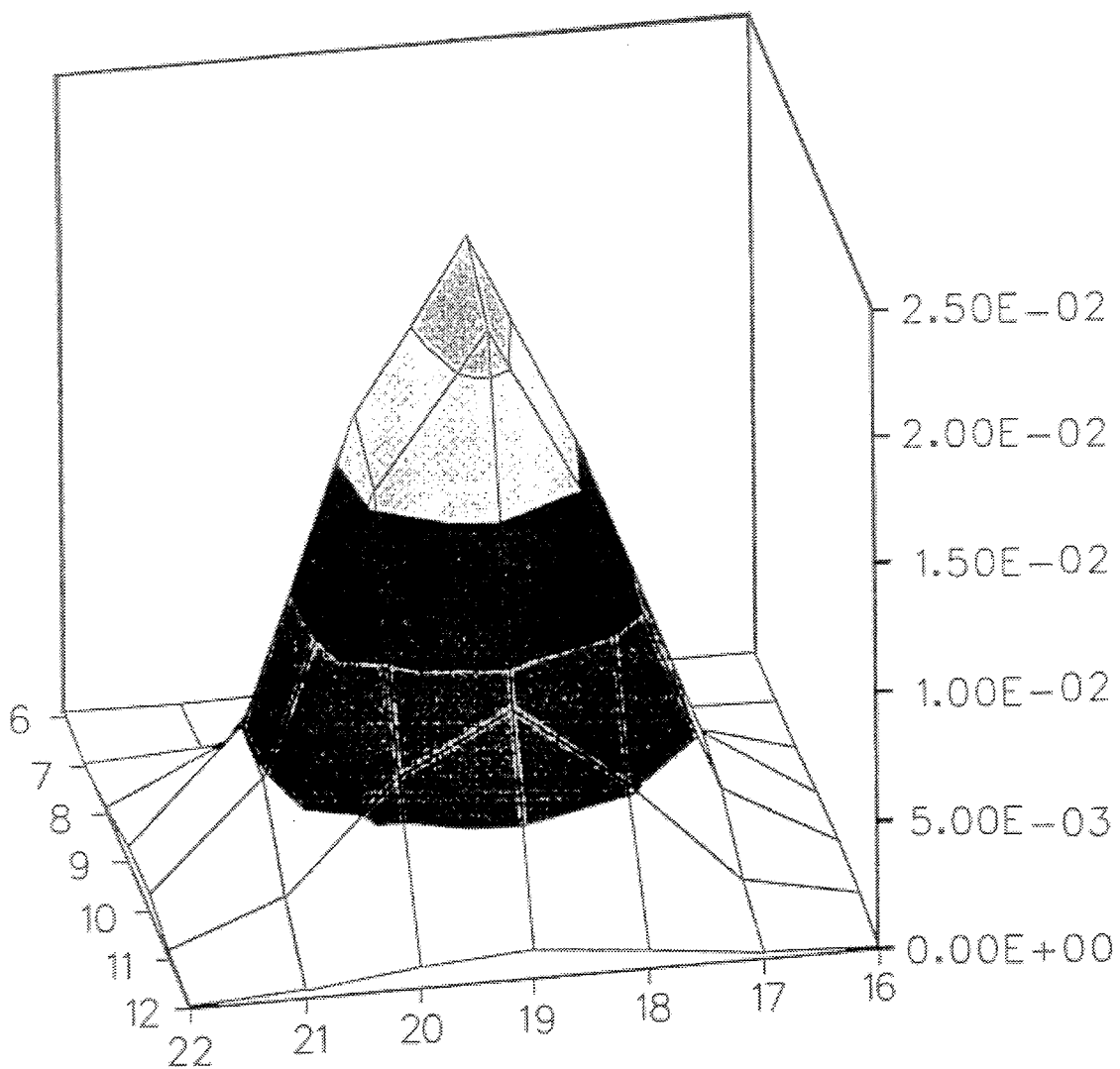
FIG. 9B shows an expanded view of a signal peak from FIG. 9A.

In order to accurately measure the peak frequencies, amplitudes, and phases, the effect of the sampling and windowing on the image primitive is modeled. FIG. 9A is a graph of the amplitude of a two-dimensional FFT of a bar pattern image over a small selection of the frequency domain. The horizontal frequency axis runs parallel to arrow 912, while the vertical frequency axis runs parallel to arrow 913. The third axis 911 of the graph represents the amplitude of the FFT. The arrow 913 runs along the horizontal Nyquist frequency. The peaks 901 and 902 are the unaliased odd harmonics closest to the Nyquist frequency, much like 808 and 809 from FIG. 8. The peaks 906 and 907 are the aliased odd harmonics closest to the Nyquist frequency, much like peaks 810 and 811 from FIG. 8. In the example in FIG. 9A however, there are also weaker even harmonics 903, 904, 905, 908, and 909 present. As noted above, if a bar pattern has transparent and opaque bars of precisely equal width, and the imaging system is linear, there are no even harmonics in the frequency representation of the captured image. However, in practice, manufacturing tolerances in the bar pattern, and small non-linearities in the imaging system will often give rise to small even harmonics like the ones shown in FIG. 9A. FIG. 9B is an expanded view of the peak 901 from FIG. 9A, meant to illustrate in greater detail the shape of the peak.

Figure 10A:
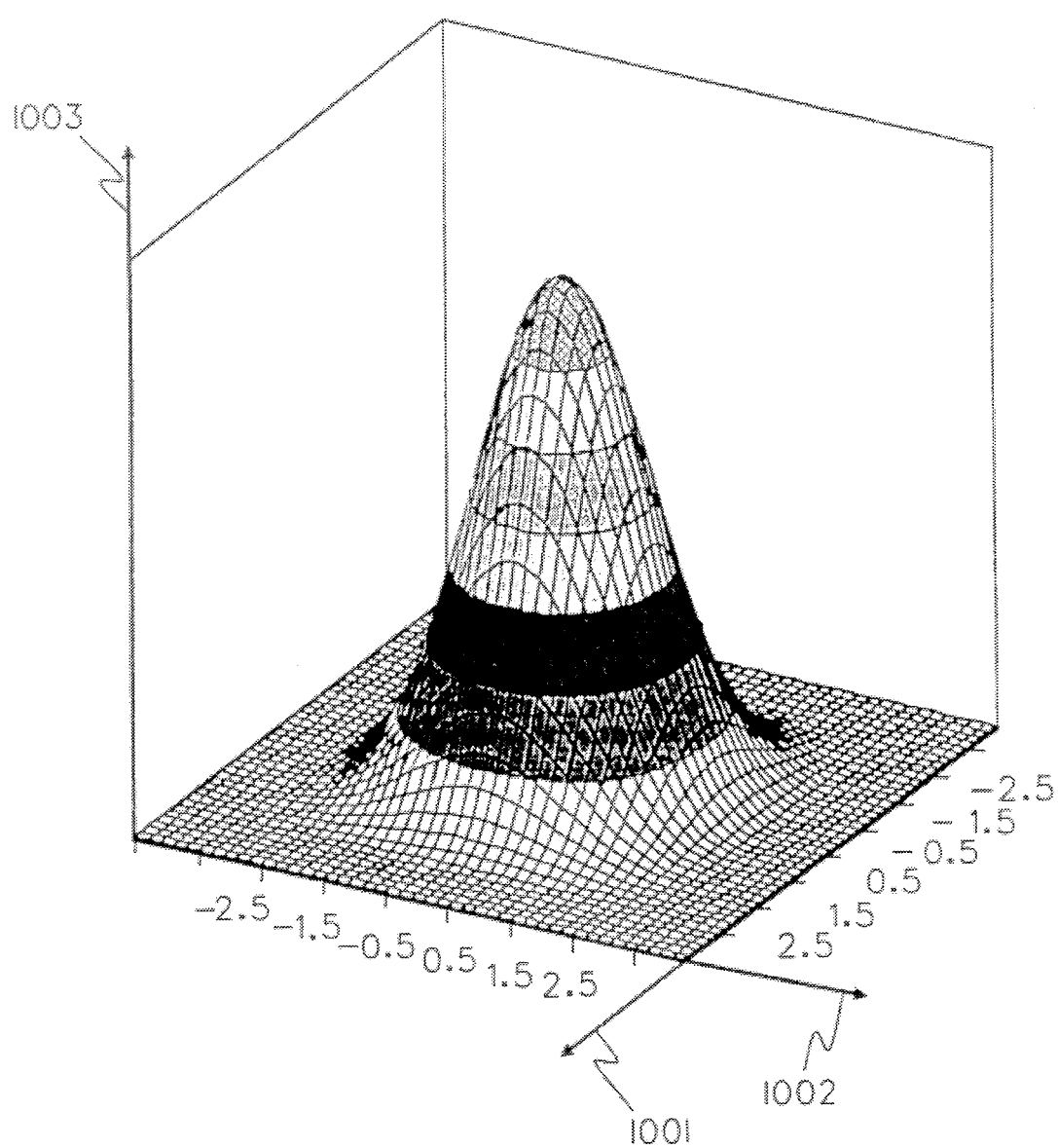
FIG. 10A shows a graph of the Fourier transform of the windowing function used in computing the Fourier transforms in one embodiment of the invention.

FIG. 10A illustrates the Fourier transform of the window of Equation (10), which is used prior to Fourier transformation of the image, in step 53. The axes 1001 and 1002 indicate the frequency axes, and the frequencies are measured in multiples of the lowest frequency which has one complete cycle in the window. The vertical axis 1003 represents the amplitude of the Fourier transform. The shapes of the signal peaks, such as 901, can be accurately modeled as scaled, shifted, and sampled versions of the Fourier transform of the windowing function, such as the function illustrated in FIG. 10A. The appropriate parameters to use for scaling and shifting the function can be identified by fitting the data.

The sampling takes place at integer multiples of the lowest frequency which has one complete cycle in the window.

Figure 10B:
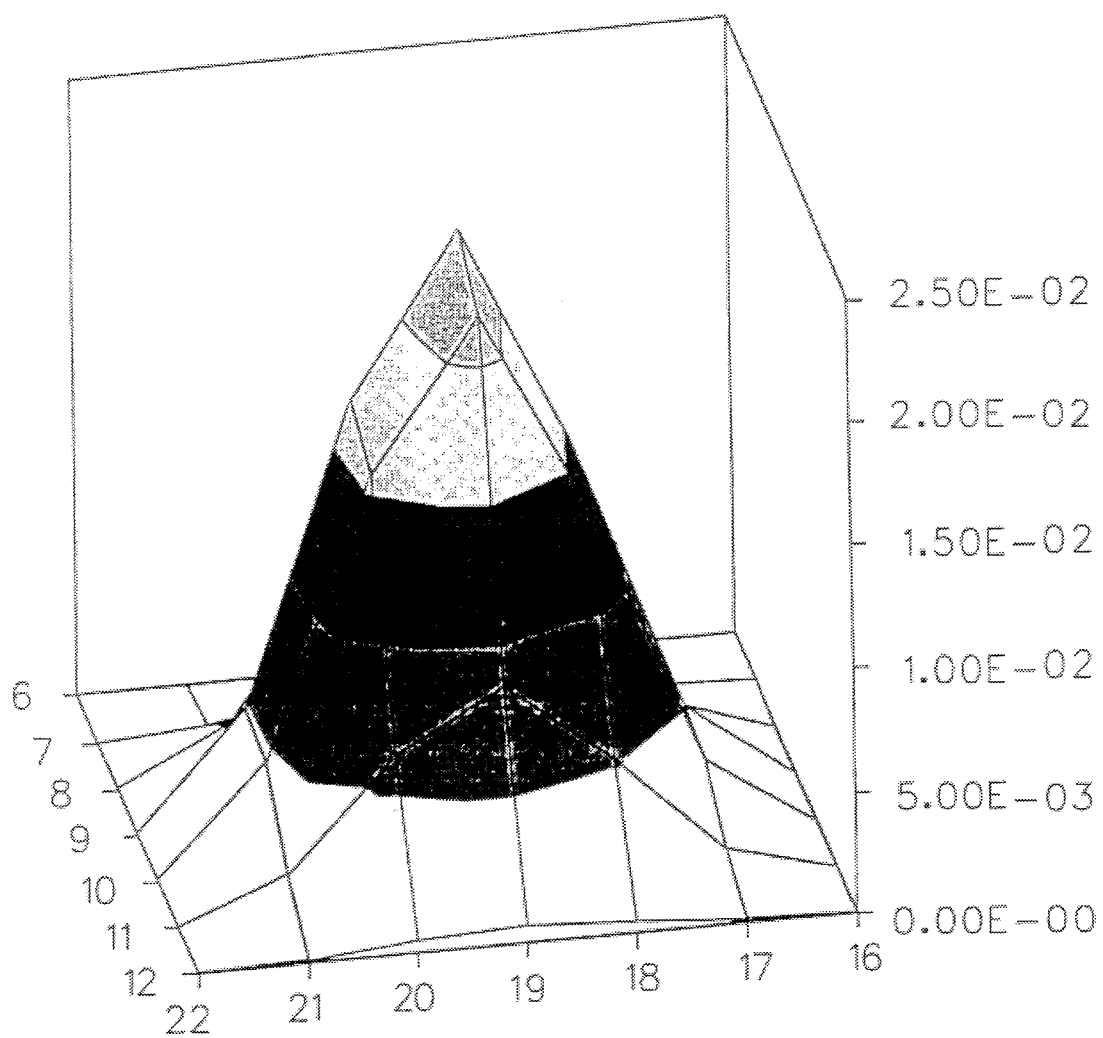
FIG. 10B shows a scaled and sampled view of the function graphed in FIG. 10A, where the scaling and sampling parameters are chosen to model the peak graphed in FIG. 9B.

One appropriate method of fitting the data is to use Newton minimization, or other minimization techniques to find values of the amplitude, phase and location of a peak which minimizes the summed absolute square difference between the model peak and the data. The peak 901 expanded in FIG. 9B was fit with this technique, using the Fourier transform of the windowing function as illustrated in FIG. 10A. The amplitude of the resulting model peak is plotted in FIG. 10B. Note that there is almost no visible difference between the model peak in FIG. 10B and the actual data, in FIG. 9B. As can be clearly seen, the data accurately mirrors the model allowing accurate measurements of the frequency, amplitude, and phase of the peak. In particular, the measurements are much more accurate than they would be if relying on any one sample from the frequency representation to derive the measurements, because a large number of samples are combined to derive the best fit. The fit shown here was generated from a single peak and the method of the invention may be extended to resolve multiple overlapping peaks by introducing additional free parameters to model the additional peaks.

In the preferred embodiment of the invention, after the summed absolute square difference between the model peak and the data is minimized, the minimum value of this summed square difference, $\epsilon_{min}$, is used to estimate the precision of the measurement of the STF at the frequency of the peak. In particular, the formula:

$$R = \sqrt{\epsilon_{min}/Q} \qquad (12)$$

defines a root mean square (RMS) error R, in terms of $\epsilon_{min}$ and the summed absolute square value of Q of the model peak. The RMS error R indicates the relative precision of the MTF measurement, and the absolute precision of the PTF measurement. Since it is the periodic nature of the signal which gives rise to signal peaks shaped according to the Fourier transform of the windowing function, any deviation from periodicity in the signal will give rise to an increase in the value of R.

Refer now to FIG. 5. At step 58, once the signal peaks have been measured in step 57, the magnitude of the system transfer function (STF) may be computed. In step 58, the computer 401 computes the magnitude of the STF, by dividing the magnitude of each unaliased signal peak by the predetermined magnitude of the corresponding peak of the Fourier transform of the image primitive. If desirable, the magnitude of the STF may also be normalized by multiplying by a factor which sets the zero frequency STF to one.

The computation of the phase of the STF in step 59 may be slightly complicated by the fact that the relative positions of the image boundaries and the image primitive may not be precisely controlled. A spatial translation of the image primitive corresponds to multiplication by a linear phase factor in the frequency domain. To factor out this linear phase, in one embodiment, the linear phase which sets the phase of the fundamental frequency of the image to zero is subtracted from the phase of the image. After the subtraction, the phase of each harmonic is compared to the predetermined corresponding phase of the original pattern to determine the phase of the STF. In an alternate embodiment, the difference between the phase of the image and the phase of the pattern across a range of frequencies may be used to derive a best fit line with a zero intercept. This line then represents the linear phase to be subtracted from the phase of the image before computing the STF phase.

Once the phase and amplitude of the STF of the system have been accurately measured, this diagnostic information may be used in a variety of ways to improve the system. For example, the measured STF can be compared to minimum and maximum STF values to determine if the phase and amplitude are both within acceptable limits for the system in question. If either phase or amplitude is not acceptable, in one embodiment of the invention, the STF data are used to select electronic components to bring the phase and amplitude of an electronic CCD camera within limits when used with specific test optics. In another embodiment, the STF data are used to compute a digital filter, which when applied to the images collected by the imaging system, corrects the frequency response of the system so that it falls inside the acceptable STF limits. In another application, a low-frequency MTF measurement which is lower than a predetermined value, such as 0.94, will cause the system to signal to an operator that the objective lens of the system is dirty, so that the operator knows to clean the lens. In yet another application, a low-frequency RMS error R which is above a predetermined value, such as 0.005, will detect an improper calibration condition, and cause the system to initiate automatic re-calibration.

Figure 12:
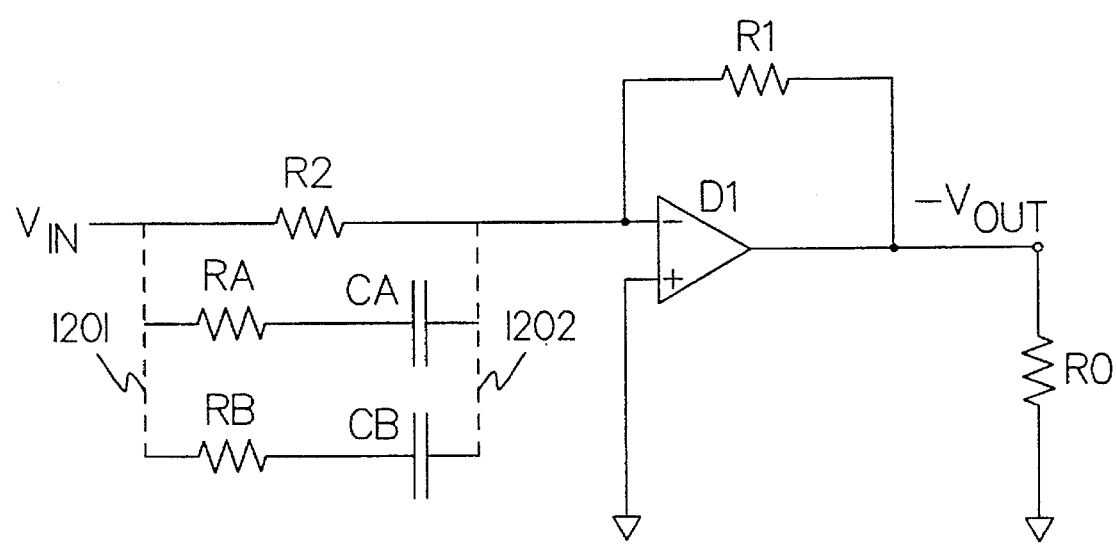
FIG. 12 shows a video camera amplifier.

Refer now to FIG. 12 which shows a video camera amplifier. In order to demonstrate the use of the invention the process of normalizing the STF of a system with an electronic camera, will be described. A very common element in electronic video cameras, an amplifier stage, is shown in block diagram form in FIG. 12. A video signal voltage $V_{in}$ is applied to the input and generates a current through resistor R2, that is converted to an output voltage $V_{out}$ by the resistor R1, through the action of the differential amplifier D1. The output signal $V_{out}$ then drives the next stage of the video circuitry, represented schematically here by the resistor R0. In the absence of the additional components RA, CA, RB, CB connected by the dashed lines 1201 and 1202, the output voltage $V_{out}$ can, to a good approximation, be expressed simply as:

$$V_{out} = -\frac{R_1}{R_2} V_{in} \qquad (13)$$

It often happens in the production of electronic video cameras, because of tolerances in the components from which they are manufactured, that the video STF varies from manufacturing batch to manufacturing batch, and from camera to camera. Any video amplifier stage present in the camera, such as the one shown in FIG. 12, can then be used, in combination with an accurate measuring technique for STF, such as the one described above, to normalize the camera STF. Note that the measurement technique must be used to measure the STF along an axis which is very close to the video scanning axis of the camera, in order to make the measurement relevant to the video STF.

Consider a case in which the high-frequency MTF of a camera is lower than a predetermined minimum MTF, and the high-frequency PTF may also be higher than a predetermined maximum PTF. The addition of the components RA, CA, RB, and CB to the video amplifier in FIG. 12, connected as indicated by the dashed lines 1201 and 1202, will boost the MTF, and lower the PTF, of the camera. In particular, the equation defining the circuit response becomes:

$$V_{out}(\omega) = \qquad (14)$$
$$-R_1 \left( \frac{1}{R_2} + \frac{j\omega C_A}{1+j\omega R_A C_A} + \frac{j\omega C_B}{1+j\omega R_B C_B} \right) V_{in}(\omega)$$

where $\omega$ is a frequency, $V_{out}$ is the Fourier transform of the output signal, and $V_{in}$ is the Fourier transform of the input signal. Thus, the system transfer function of the camera after the new components are added, $S_{mod}$, can be written in terms of the original camera system transfer function $S_{orig}$, by the equation:

$$S_{mod}(\omega) = \left(1 + \frac{j\omega R_2 C_A}{1 + j\omega R_A C_A} + \frac{j\omega R_2 C_B}{1 + j\omega R_B C_B}\right) S_{orig}(\omega) \quad (15)$$

In some cases it may be necessary to factor out any linear phase factor introduced by Equation 15, by the same method that is used to factor out linear phase from the STF measurement, before it can be used to predict the result of an STF measurement following the introduction of the circuit modification.

Using Equation 15, it may be possible to modify a camera which falls outside a specified MTF and PTF range, so that it falls within the range. It is necessary to select appropriate values of the components RA, CA, RB and CB to attempt to bring the STF into the specified range. One method of selecting the components is to exhaustively search all combinations of a predetermined range of component values in an attempt to find one or more combinations which will give rise to an STF in the desired range. This is a very inefficient search strategy. The invention provides a more efficient method of selecting the best component values.

The search method of the invention depends on defining a target STF, and a distance measure from that target STF. Define the target STF by the formulas:

$$M_t = \frac{1}{2}(M_{max} + M_{min}) \quad (16)$$

$$\phi_t = \frac{1}{2}(\phi_{max} + \phi_{min}) \quad (17)$$

where $M_t$ is the target MTF, $M_{max}$ is the maximum acceptable MTF, $M_{in}$ is the minimum acceptable MTF, $\Phi_t$ is the target PTF, $\Phi_{max}$ is the maximum acceptable PTF, and $\Phi_{min}$ is the minimum acceptable PTF. This defines the target STF as the middle of the acceptable range of STF.

In order to define a distance measure from the target STF, first define a pair of functions which reflect the width of the limits:

$$\Delta M = M_{max} - M_{min} \quad (18)$$

$$\Delta \Phi = \Phi_{max} - M_{min} \quad (19)$$

The index i refers to the n frequencies below the Nyquist at which the STF is measured. $M^i$ is the MTF at the frequency corresponding to i and $\Phi^i$ is the corresponding value of the PTF. Then, a useful measure of the distance from the target STF may be written:

$$D = \sqrt{\sum_{i=1}^{n} \left(\frac{M^i - M_t^i}{\Delta M^i}\right)^2 + \left(\frac{\phi^i - \phi_t^i}{\Delta \phi^i}\right)^2} \quad (20)$$

The search for the appropriate component values then becomes a search for the minimum of the distance function D. Standard numerical methods can be used to perform the minimization. In particular, since the distance function D is everywhere continuous and differentiable with respect to the component values RA, CA, RB, and CB, it is feasible to use higher order methods to find local minima. When coupled with a selection of several starting points for the minimization, this is a much more effective search strategy than an exhaustive search.

Figure 13:
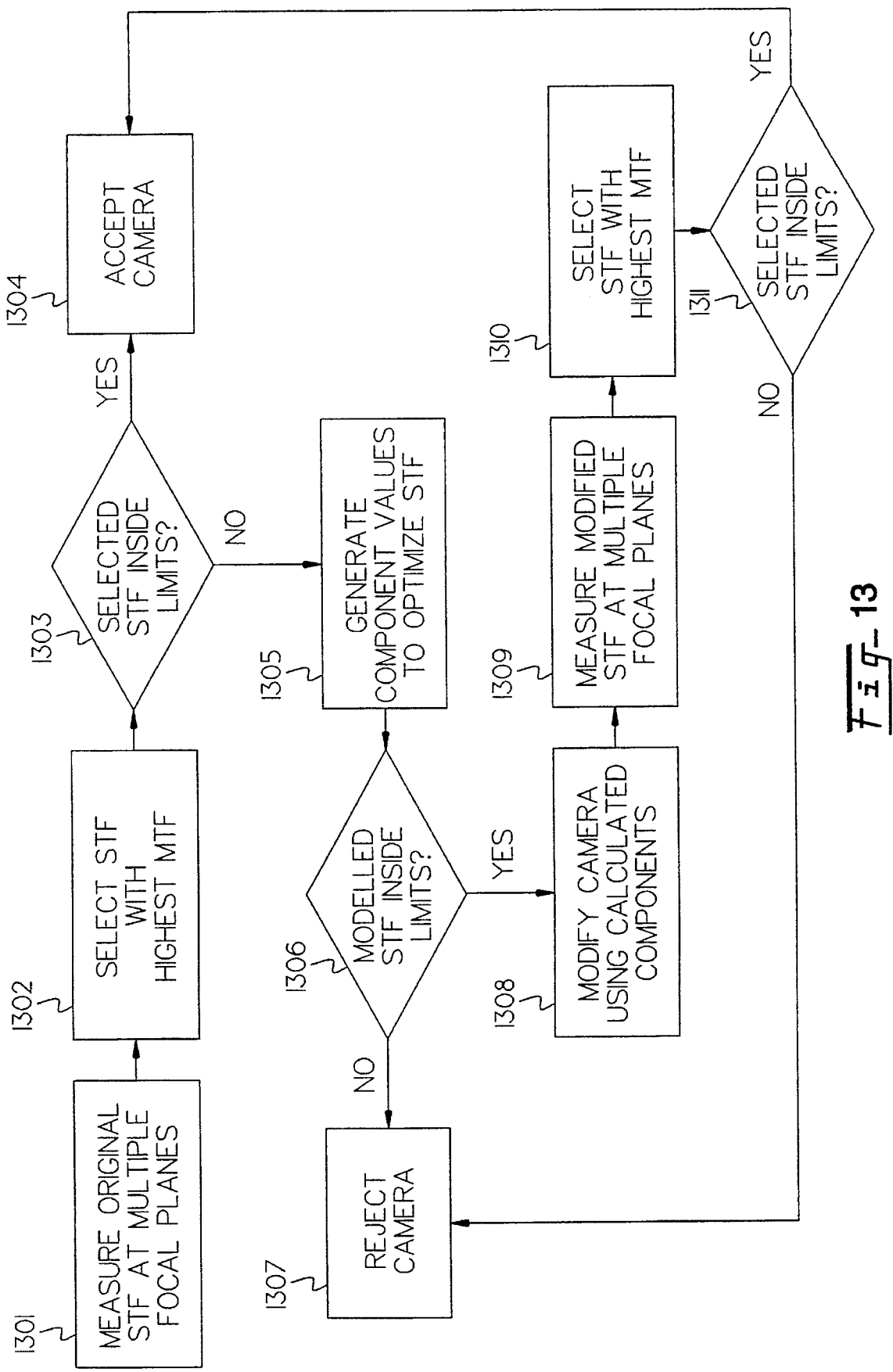
FIG. 13 is a process flow diagram of the method of the invention used to modify cameras to fall within a specified STF range.

FIG. 13 is a process flow diagram of the method of the invention used to modify video cameras to fall within a specified STF range. At step 1301, the camera is placed in an apparatus like the apparatus of FIG. 4. The STF of the system is measured at multiple focal planes by scanning the stage 403 toward the objective 407, and capturing and processing multiple images of the image primitive 406. The focal plane with the highest MTF is selected to represent the optimum STF obtained with the camera 408 at step 1302. The selected STF is compared with the minimum and maximum PTF and MTF limits in step 1303, to determine if the original camera already falls in the required range.

If the camera passes the test, it is accepted for use in manufacturing at step 1304. If not, electronic component values are generated to minimize the distance of the modified STF from the target STF, according to the method outlined above, at step 1305. At step 1306, the component values are then used to predict the STF which will result from their installation in the camera, and this predicted STF is compared with the limits to determine if it is within the accepted range. If it is not acceptable, then the camera could not be corrected by this procedure, and must be rejected at step 1307.

If the predicted STF does fall within the required range, the camera is modified by installing the components RA, CA, RB, CB in one of the video amplifier stages of the camera, as shown in FIG. 12, at step 1308. After the modification, the optimum STF testing of steps 1301 and 1302 is repeated at steps 1309 and 1310, with the modified camera. Once again, the selected, measured STF is compared to the limits at step 1311. If the modified camera passes the limits, it has been successfully corrected, and is accepted for use in manufacturing at step 1304. If the modified camera fails the limits at step 1311, then the camera was not successfully corrected by the procedure, and is rejected at sep 1307.

In one embodiment of the invention, the system disclosed herein is used in a system for analyzing cervical pap smears, such as that shown and disclosed in U.S. patent application Ser. No. 07/838,064, entitled "Method For Identifying Normal Biomedical Specimens", by Alan C. Nelson, et al., filed Feb. 18, 1992, now abandoned; U.S. patent application Ser. No. 08/179,812 filed Jan. 10, 1994, now U.S. Pat. No. 5,528,703, which is a continuation in part of U.S. patent application Ser. No. 07/838,395, entitled "Method For Identifying Objects Using Data Processing Techniques", by S. James Lee, et al., filed Feb. 18, 1992, now abandoned U.S. patent application Ser. No. 07/838,070, now U.S. Pat. No. 5,315,700, entitled "Method And Apparatus For Rapidly Processing Data Sequences", by Richard S. Johnston et al., filed Feb. 18, 1992; U.S. patent application Ser. No. 07/838,065, now U.S. Pat. No. 5,361,140 entitled "Method and Apparatus for Dynamic Correction of Microscopic Image Signals" by Jon W. Hayenga et al., filed Feb. 18, 1992; and U.S. patent application Ser. No. 08/302,355, filed Sep. 7, 1994 entitled "Method and Apparatus for Rapid Capture of Focused Microscopic Images" to Hayenga et al., which is a continuation-in-part of application Ser. No. 07/838,063 filed on Feb. 18, 1992, now abandoned, the disclosures of which are incorporated herein, in their entirety, by the foregoing references thereto.

The present invention is also related to biological and cytological systems as described in the following patent applications which are assigned to the same assignee as the present invention, filed on Sep. 20, 1994 (unless otherwise noted), and which are all hereby incorporated by reference including U.S. patent application Ser. No. 08/309,118 to Kuan et al. entitled, "Field Prioritization Apparatus and Method," U.S. patent application Ser. No. 08/309,061 to Wilhelm et al., entitled "Apparatus for Automated Identification of Cell Groupings on a Biological Specimen," U.S. patent application Ser. No. 08/309,116 to Meyer et al.

entitled "Apparatus for Automated Identification of Thick Cell Groupings on a Biological Specimen," U.S. patent application Ser. No. 08/098,115 to Lee et al. entitled "Biological Analysis System Self Calibration Apparatus," now abandoned, U.S. patent application Ser. No. 08/308,992 to Lee et al. entitled "Apparatus for Identification and Integration of Multiple Cell Patterns," U.S. patent application Ser. No. 08/309,063 to Lee et al. entitled "A Method for Cytological System Dynamic Normalization," U.S. patent application Ser. No. 08/309,248 to Rosenlof et al. entitled "Method and Apparatus for Detecting a Microscope Slide Coverslip," U.S. patent application Ser. No. 08/309,077 to Rosenlof et al. entitled "Apparatus for Detecting Bubbles in Coverslip Adhesive," U.S. patent application Ser. No. 08/309,931 to Lee et al. entitled "Cytological Slide Scoring Apparatus," U.S. patent application Ser. No. 08/309,148 to Lee et al. entitled "Method and Apparatus for Image Plane Modulation Pattern Recognition", U.S. patent application Ser. No. 08/309,250 to Lee et al. entitled "Apparatus for the Identification of Free-Lying Cells," U.S. patent application Ser. No. 08/309,117 to Wilhelm et al., entitled "Method and Apparatus for Detection of Unsuitable Conditions for Automated Cytology Scoring." Also incorporated by reference is U.S. patent application Ser. No. 08/455,296, filed May 31, 1995 attorney docket no. 1901, assigned to the same assignee, to Lee et al., entitled "Method and Apparatus for Continuously Monitoring and Forecasting Slide and Specimen Preparation for a Biological Specimen Population."

Figure 11A:
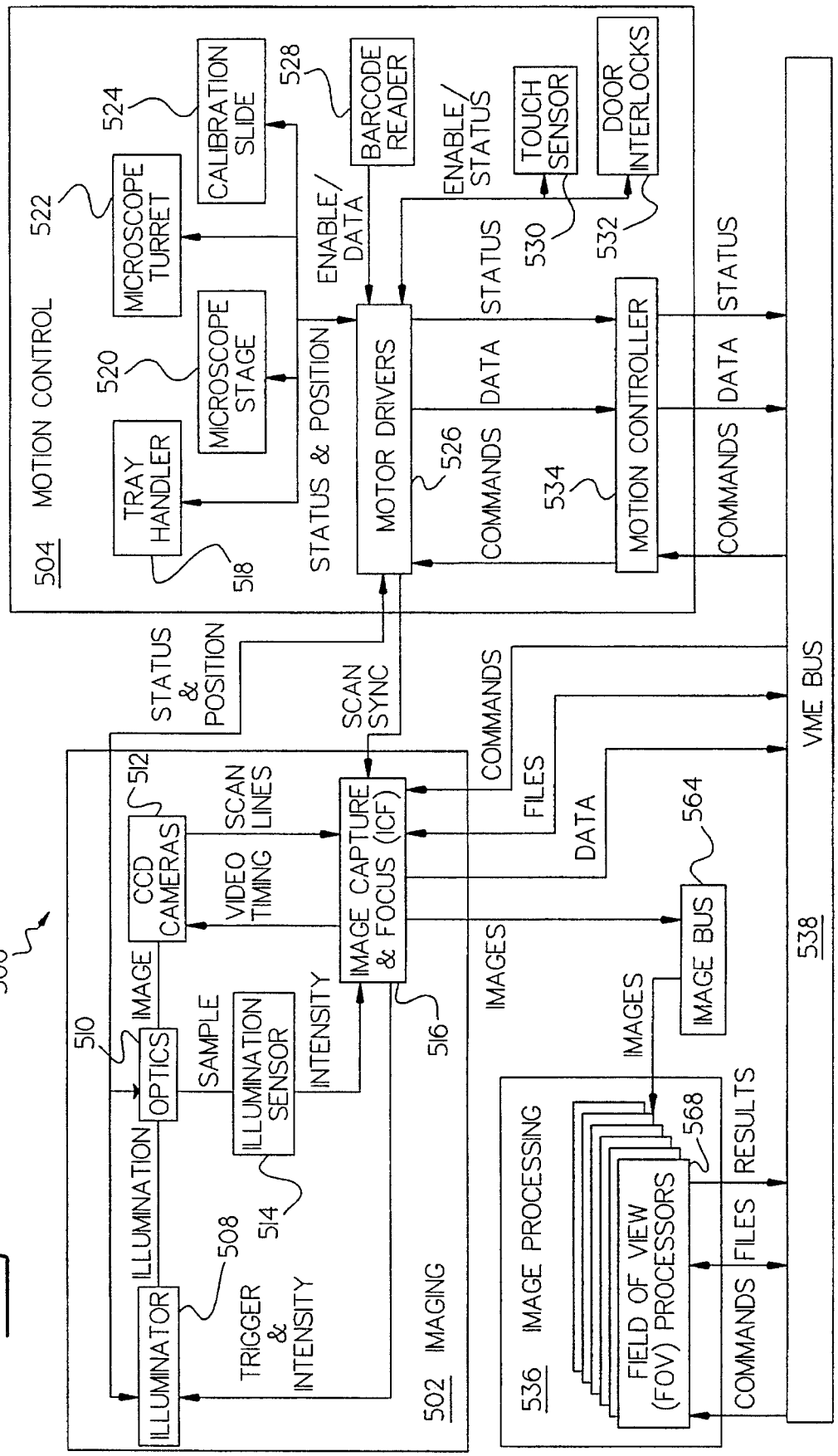
FIGS. 11A, 11B and 11C show one example optical system employing the method of the invention.
Figure 11B:
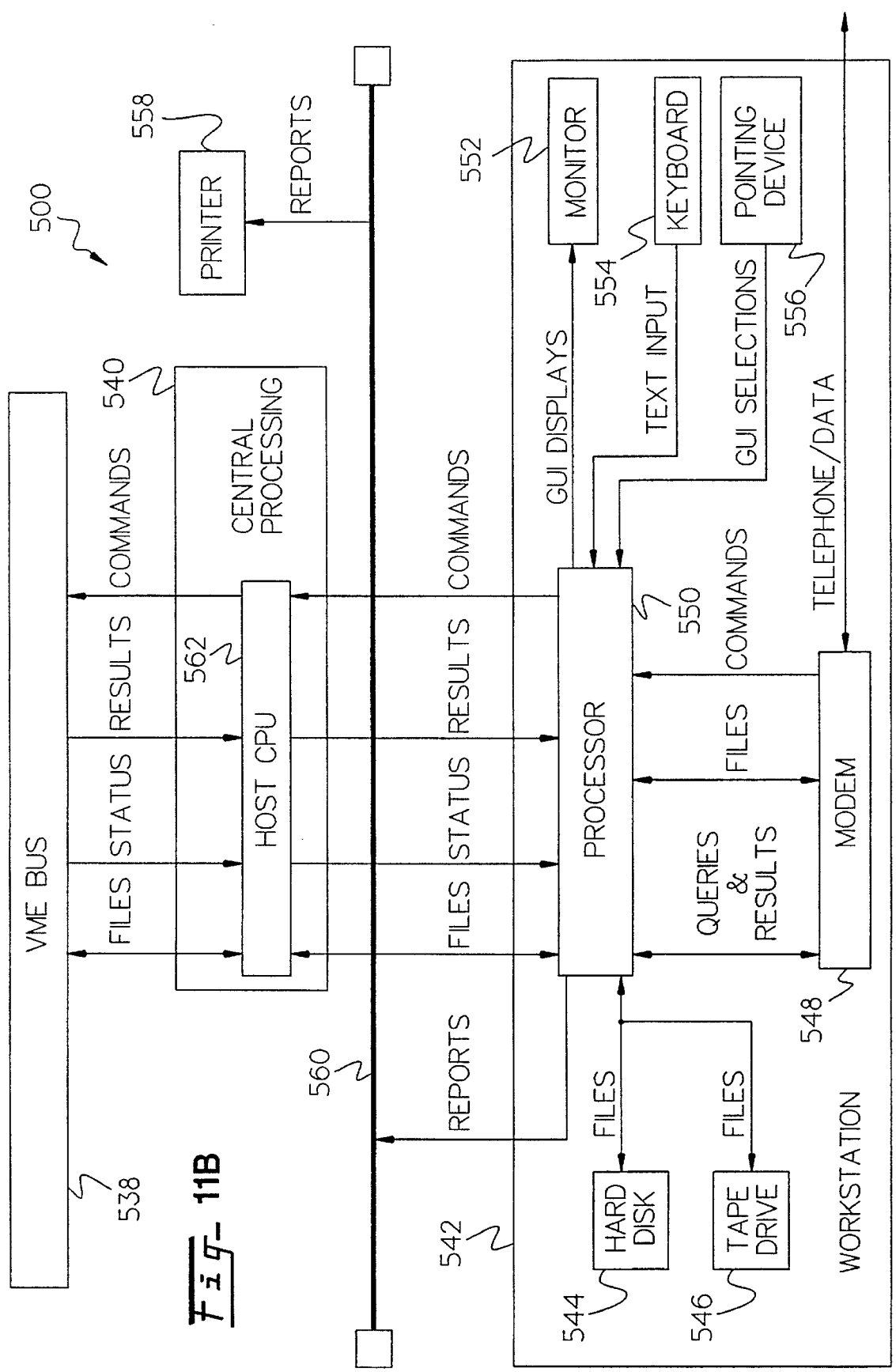
Figure 11C:
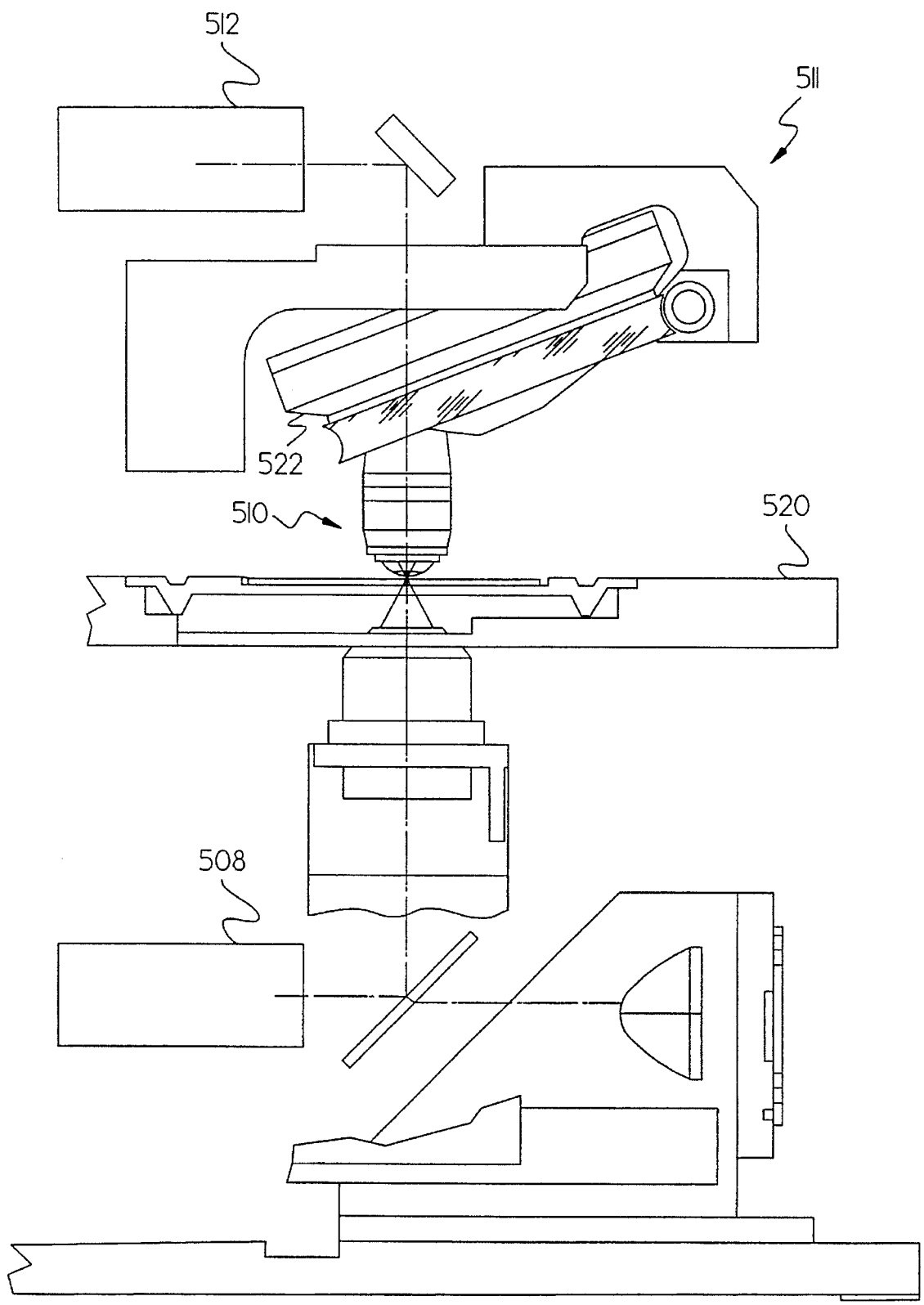

Now refer to FIGS. 11A, 11B and 11C which show a schematic diagram of one embodiment of an image interpretation apparatus for assessing slide and specimen preparation quality 500. The image interpretation apparatus comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In some embodiments optics 510 may comprise color filters. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a SUN workstation. A tape drive 546 is connected to the workstation 550 as well as a modem 548, a monitor 552, a keyboard 554, and a mouse pointing device 556. A printer 558 is connected to the Ethernet 560.

During operation, the central computer 540, running a real time operating system, controls the microscope 511 and the processor to acquire and digitize images from the microscope 511. The computer 540 also controls the microscope 511 stage to position the specimen under the microscope objective, and from one to fifteen field of view (FOV) processors 568 which receive images under control of the computer 540.

It is to be understood that the various methods described herein may be implemented in software suitable for running on a digital processor. The software may be embedded, for example, in the central processor 540.

Figure 14:
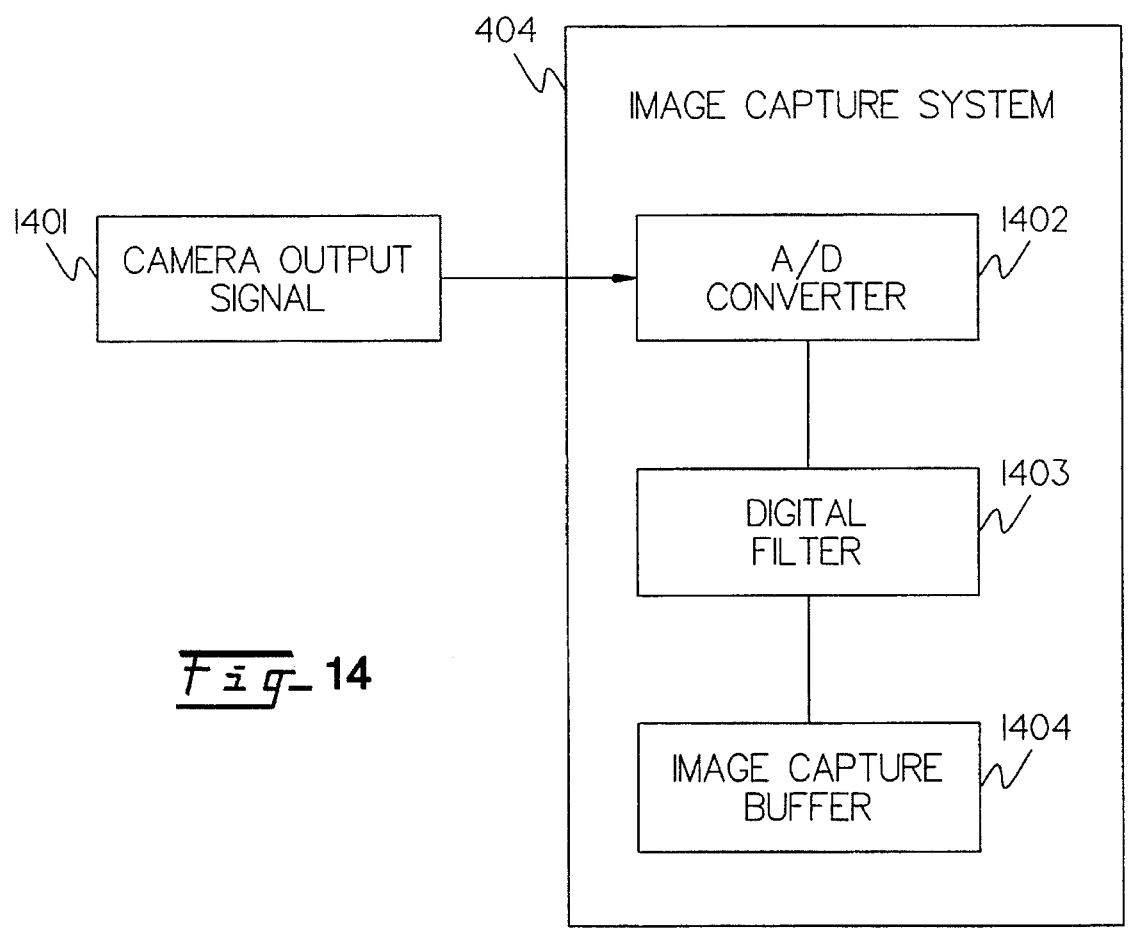
FIG. 14 shows a schematic diagram of a digital filter used to control the system transfer function of an imaging system.

Refer now to FIG. 14, which shows a block diagram of part of the image capture system 404 in one embodiment of the invention. After the camera output signal 1401 is converted to digital form by the A/D converter 1402, it passes through a digital filter 1403, which modifies the system transfer function before the image is stored in the image capture buffer 1404. The digital filter 1403 can be tuned using a method very similar to that shown in FIG. 13, which was used to adjust the analog filter shown in FIG. 12, in order to correct the system transfer function. An example digital filter implements the equation:

$$O_q = \sum_{j=0}^{m} C_j I_{q-j} + \sum_{k=1}^{n} K_k O_{q-k} \tag{21}$$

where $O_q$ represents the output signal, as indexed by the integer q, I represents the input signal, and C and K are the parameters which define the response of a particular filter. This example filter changes the system transfer function by multiplying it by a factor. The system transfer function including the action of this digital filter, $S_{mod}$, can be written in terms of the original system transfer function $S_{orig}$, by the equation:

$$S_{mod}(\omega) = \frac{\sum_{j=0}^{n} C_j \exp(-ijw)}{1 - \sum_{k=1}^{n} K_k \exp(-ikw)} S_{orig}(\omega) \tag{22}$$

where w is the frequency. The same minimization performed with the analog filter in terms of the component values RA, CA, RB, CB, can be performed with the digital filter in terms of the parameters C and K, with only the additional constraint on the values of K, that they describe a stable filter.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to measure a system transfer function of an imaging system having an input and an image sampler with a discrete image output wherein the discrete image output can be represented by a frequency representation with aliased components and unaliased components, the method comprising the steps of:

(a) providing an image primitive to the input, the image primitive comprising a substantially uniaxial pattern having a predetermined frequency representation, the image primitive being oriented at a predetermined angle relative to the image sampler wherein the predetermined angle is chosen to separate the aliased components from the unaliased components;

(b) obtaining a discrete image of the image primitive with the imaging system;

(c) computing a two-dimensional frequency representation of the discrete image;

(d) selecting a region of the two-dimensional frequency representation; and (e) comparing the region to the predetermined frequency representation to compute the system transfer function.

2. The method of claim 1 wherein the image primitive comprises a bar pattern.

3. The method of claim 1 wherein the substantially uniaxial pattern further comprises a substantially periodic pattern.

4. The method of claim 1 wherein the predetermined angle is a small angle.

5. The method of claim 1 wherein the predetermined angle is in a range of greater than 0° and less than 15°.

6. The method of claim 1 further comprising the step of multiplying the discrete image by a windowing function.

7. The method of claim 1 further comprising the steps of filtering with a filter and subsampling the discrete image in a predetermined axis to suppress noise from the discrete image.

8. The method of claim 7 further comprising the step of correcting an effect of filtering by dividing a frequency representation of the discrete image by a frequency representation of the filter.

9. The method of claim 1, wherein the system transfer function has an STF phase, wherein the region has a signal phase, and wherein the predetermined frequency representation has a pattern phase further comprising the steps of:

(a) subtracting the pattern phase from the signal phase to generate a difference phase;

(b) determining a linear phase that best fits the difference phase; and (c) computing the STF phase as a difference between the linear phase and the difference phase.

10. The method of claim 9 wherein the step of determining a linear phase that best fits the difference phase further comprises setting a phase of a fundamental frequency of the difference phase to zero.

11. The method of claim 3, wherein the substantially periodic pattern generates frequencies with frequency peaks, further comprises the steps of:

(a) locating of the frequency peaks; and (b) measuring their amplitudes and phases.

12. The method of claim 11 further comprising the step of fitting the frequency peaks using a model peak comprising a scaled and translated frequency representation of a windowing function.

13. The method of claim 12 further comprising the step of applying minimization techniques to find values of an amplitude, phase, and location of the model peak which minimizes a summed square difference between the model peak and data.

14. The method of claim 13 wherein the step of applying minimization techniques further comprises applying Newton's minimization method.

15. The method of claim 11 wherein a magnitude of a system transfer function is computed by dividing the magnitude of each frequency peak by the magnitude of a corresponding peak of the predetermined frequency representation.

16. The method of claim 1 wherein the frequency representations comprise Fourier Transforms.

17. The method of claim 1 wherein the step of computing a two-dimensional frequency representation of the discrete image further comprises computing a Fast Fourier Transform.

18. The method of claim 1 where the step of selecting a region of the two-dimensional frequency representation further comprises determining a band passing through an origin of the frequency representation oriented at an angle chosen to maximize power within the band.

19. The method of claim 1 where the step of selecting a region of the two-dimensional frequency representation further comprises selecting a band corresponding to the predetermined angle.

20. The method of claim 12 further comprising the step of applying minimization techniques to find values of the amplitude phase and location of multiple model peaks which minimize the sum square difference between the sum of the model peaks and the data.

21. An apparatus to measure frequency response of an imaging system having an input and an image sampler with a discrete image output wherein the discrete image output can be represented by a frequency representation with aliased components and unaliased components, the apparatus comprising:

(a) an image primitive placed in view of the input, the image primitive comprising a substantially uniaxial pattern having a predetermined frequency representation, the image primitive being oriented at a predetermined angle relative to the image sampler wherein the predetermined angle is chosen to separate the aliased components from the unaliased components;

(b) means, connected to the discrete image output, for computing a two-dimensional frequency representation of the discrete image output, having a computing output;

(c) means, connected to the computing output, for selecting a region of the two-dimensional frequency representation, having a selected region output; and (d) means, connected to the selected region output, for comparing the region to the predetermined frequency representation to compute an optical transfer function, having an optical transfer function output.

22. The apparatus of claim 21 wherein the means for computing a two dimensional frequency representation of the discrete image output further comprises a digital computer.

23. The apparatus of claim 21 wherein the means for selecting a region of the two-dimensional frequency representation further comprises a digital computer.

24. The apparatus of claim 21 wherein the means for comparing the region to the predetermined frequency representation to compute the optical transfer function output further comprises a digital computer.

25. The apparatus of claim 21 wherein the image sampler further comprises an electronic camera.

26. The apparatus of claim 21 wherein the image sampler further comprises a charge coupled device camera.

27. An imaging system control apparatus, for an imaging system having a transfer function control input, wherein the imaging system has a system transfer function and system transfer function control input, the imaging system control apparatus comprising:

(a) means for measuring the system transfer function of the imaging system having a system transfer measure output; and (b) means for controlling the system transfer function in response to the system transfer measure output connected to the system transfer measure output, wherein the means for controlling the system transfer function is connected to the system transfer function control input.

28. The apparatus of claim 27 wherein the imaging system further comprises a charge coupled device camera.

29. The apparatus of claim 27 wherein the means for controlling the system transfer function in response to the system transfer measure output comprises a plurality of trim resistor - capacitor combinations.

30. The apparatus of claim 27 wherein the means for controlling the system transfer function in response to the system transfer measure output comprises a digital filter.

31. The apparatus of claim 27 wherein the imaging system further comprises an image interpretation apparatus imaging system.

32. A method of modifying a system transfer function of an image system comprising the steps of:

(a) measuring an original system transfer function at multiple focal planes;

(b) selecting a system transfer function with a highest modulation transfer function;

(c) checking if the system transfer function is within predetermined limits;

(d) calculating imaging system component values to optimize system transfer function;

(e) checking if a modeled system transfer function is within the predetermined limits;

(f) modifying the image system using the calculated components;

(g) measuring a modified system transfer function at multiple focal planes;

(h) selecting the system transfer function with the highest modulation transfer function; and (i) checking if the system transfer function is within the predetermined limits.

* * * * *

UNITED STATES PATENT AND TRADEMARK OFFICE
CERTIFICATE OF CORRECTION

PATENT NO. : 5,621,519
DATED : April 15, 1997
INVENTOR(S) : Frost et al.

It is certified that error appears in the above-identified patent and that said Letters Patent is hereby corrected as shown below:

Column 2, line 10, delete the equation " $\vec{Y}_i$ " and replace it with -- $\vec{y}_i$ --.

Column 13, equation 19, delete the equation " $\Delta\phi = \phi_{max} - M_{min}$ " and replace it with -- $\Delta\phi = \phi_{max} - \phi_{min}$ --.

Signed and Sealed this

Eighteenth Day of August, 1998

Attest:

BRUCE LEHMAN

*Attesting Officer*     *Commissioner of Patents and Trademarks*